US012109827B2

(12) United States Patent
Balcan et al.

(10) Patent No.: US 12,109,827 B2
(45) Date of Patent: Oct. 8, 2024

(54) MEDIA PROCESSING DEVICE WITH ENHANCED MEDIA AND RIBBON LOADING AND UNLOADING FEATURES

(71) Applicant: ZEBRA TECHNOLOGIES CORPORATION, Lincolnshire, IL (US)

(72) Inventors: Petrica Dorinel Balcan, Thousand Oaks, CA (US); Randal Wong Mun Hon, Singapore (SG); Kuan-Ying Lu, Taichung (TW)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/383,003

(22) Filed: Oct. 23, 2024

(65) Prior Publication Data

US 2024/0051320 A1 Feb. 15, 2024

Related U.S. Application Data

(60) Continuation of application No. 17/167,524, filed on Feb. 4, 2021, now Pat. No. 11,794,503, which is a (Continued)

(51) Int. Cl.

| | |
|---|---|
| *B41J 33/34* | (2006.01) |
| *B41J 2/325* | (2006.01) |
| *B41J 15/00* | (2006.01) |
| *B41J 15/02* | (2006.01) |
| *B41J 15/04* | (2006.01) |
| *B41J 15/14* | (2006.01) |
| *B41J 32/00* | (2006.01) |
| *B41J 33/00* | (2006.01) |
| *B41J 33/02* | (2006.01) |
| *B41J 33/06* | (2006.01) |
| *B41J 33/12* | (2006.01) |

(Continued)

(52) U.S. Cl.

CPC ............... *B41J 33/34* (2013.01); *B41J 2/325* (2013.01); *B41J 15/00* (2013.01); *B41J 15/044* (2013.01); *B41J 32/00* (2013.01); *B41J 33/00* (2013.01); *B41J 33/02* (2013.01); *B41J 35/04* (2013.01); *B41J 35/28* (2013.01); *B41J 15/02* (2013.01); *B41J 15/14* (2013.01); *B41J 33/003* (2013.01); *B41J 33/06* (2013.01); *B41J 33/12* (2013.01)

(58) Field of Classification Search

CPC ... B41J 33/34; B41J 2/325; B41J 15/00; B41J 15/044; B41J 32/00; B41J 33/00; B41J 33/02; B41J 35/04; B41J 35/28; B41J 15/02; B41J 15/14; B41J 33/003; B41J 33/06; B41J 33/12

See application file for complete search history.

(56) References Cited

U.S. PATENT DOCUMENTS

2002/0041782 A1* 4/2002 Mastinick ................ B41J 29/38 400/192
2009/0311025 A1* 12/2009 Bandholz ................ B41J 33/52 400/234

* cited by examiner

*Primary Examiner* — Lisa Solomon

(57) ABSTRACT

A described example includes a ribbon cartridge having a first spool housing to receive a first spool. The ribbon cartridge further having a second spool housing to receive a second spool. The ribbon cartridge further having at least one frame member extending between the first spool housing and the second spool housing and a spool lock, wherein the spool lock is configured to engage at least one of the first spool or the second spool in response to the ribbon cartridge not being received within a ribbon positioning assembly.

10 Claims, 22 Drawing Sheets

Related U.S. Application Data continuation of application No. 16/220,919, filed on Dec. 14, 2018, now Pat. No. 10,953,677, which is a continuation of application No. 15/812,547, filed on Nov. 14, 2017, now Pat. No. 10,265,983, which is a continuation of application No. 15/491,577, filed on Apr. 19, 2017, now Pat. No. 9,844,962, which is a continuation of application No. 15/375,376, filed on Dec. 12, 2016, now Pat. No. 9,662,899, which is a division of application No. 14/571,955, filed on Dec. 16, 2014, now Pat. No. 9,550,380, which is a continuation-in-part of application No. 14/107,574, filed on Dec. 16, 2013, now Pat. No. 9,211,744.

(51) Int. Cl.

| | |
|---|---|
| ***B41J 35/04*** | (2006.01) |
| ***B41J 35/28*** | (2006.01) |

MEDIA PROCESSING DEVICE WITH ENHANCED MEDIA AND RIBBON LOADING AND UNLOADING FEATURES

CROSS-REFERENCE TO RELATED APPLICATIONS

This patent is a continuation of U.S. patent application Ser. No. 17/167,524, filed on Feb. 4, 2021, which is a continuation of U.S. patent application Ser. No. 16/220,919, now U.S. Pat. No. 10,953,677, filed Dec. 14, 2018, which is a continuation of U.S. patent application Ser. No. 15/812,547, filed Nov. 14, 2017, now U.S. Pat. No. 10,265,983, which is a continuation of U.S. patent application Ser. No. 15/491,577, filed Apr. 19, 2017, now U.S. Pat. No. 9,844,962, which is a continuation of U.S. patent application Ser. No. 15/375,376, filed Dec. 12, 2016, now U.S. Pat. No. 9,662,899, which is a divisional of U.S. patent application Ser. No. 14/571,955, filed Dec. 16, 2014, now U.S. Pat. No. 9,550,380, which is a continuation-in-part of U.S. patent application Ser. No. 14/107,574, filed on Dec. 16, 2013, now U.S. Pat. No. 9,211,744, whereby each of which is incorporated by reference herein in their entireties.

BACKGROUND OF THE INVENTION

Various embodiments of the invention are directed to printers and other systems for processing media including labels, receipt media, cards, and the like. Applicant has identified a number of deficiencies and problems associated with the manufacture, use, and maintenance of conventional printers. Through applied effort, ingenuity, and innovation, Applicant has solved many of these identified problems by developing a solution that is embodied by the present invention, which is described in detail below.

BRIEF SUMMARY

Various embodiments of the present invention are directed to a system and method for loading and unloading consumable supplies of a media processing device, and more particularly, to systems and methods for providing a compact form factor media processing device which provides convenient access to the replaceable components of the media processing device.

Embodiments of the present invention may provide a ribbon cartridge for use in a media processing device. The ribbon cartridge may include a first spool housing configured to receive a first spool, a second spool housing configured to receive a second spool, and at least one frame member extending between the first spool housing and the second spool housing. The at least one frame member may include a drive surface configured to be engaged, where the ribbon cartridge is advanced from a partially installed position in the media processing device to a fully installed position in the media processing device in response to the drive surface being engaged. According to some embodiments, the drive surface is engaged by a printhead assembly of the media processing device in response to the media processing device being moved from an open position to a closed position. An alignment recess may be defined in the first spool housing, where the alignment recess may be configured to be engaged by an alignment pin of the media processing device in response to the ribbon cartridge being installed in the fully installed position of the media processing device. Embodiments may include a radio frequency identification chip disposed proximate the alignment recess, where the radio frequency identification chip is aligned with a radio frequency reader in response to the alignment recess being engaged by the alignment pin of the media processing device.

According to some embodiments, a printhead opening may be defined between the first spool housing and the second spool housing, where a printhead assembly may be configured to pass through the printhead opening in response to the media processing device being moved from an open position to a closed position. The at least one frame member may define a channel, and the channel may be configured to guide the printhead assembly through the printhead opening in response to the media processing device being moved from the open position to the closed position. The channel may include the drive surface, and the printhead assembly of the media processing device may be configured to engage the drive surface and advance the ribbon cartridge from the partially installed position to the fully installed position in response to the media processing device being moved from the open position to the closed position. Embodiments may include a raised alignment feature, where the raised alignment feature of the ribbon cartridge is configured to engage a complementary raised alignment feature of the media processing device in response to the ribbon cartridge being advanced to the fully installed position in the media processing device.

Embodiments of the present invention may provide a ribbon cartridge for use in a media processing device. The ribbon cartridge may include a first spool housing configured to receive a first spool, a second spool housing configured to receive a second spool, a first frame member extending between the first spool and the second spool, and a second frame member extending between the first spool and the second spool. A printhead assembly opening may be defined and bounded by the first spool housing, the second spool housing, the first frame member, and the second frame member. The first frame member may define a first channel adjacent to the printhead assembly opening and the second frame member may define a second channel adjacent to the printhead assembly opening. The first channel and the second channel may each include a drive surface, where the drive surface is configured to be engaged by a printhead assembly to drive the ribbon cartridge to a fully installed position within the media processing device.

According to some embodiments, the first spool housing may define an alignment recess including an alignment surface, where the alignment recess is configured to receive therein an alignment pin when the ribbon cartridge is in the fully installed position of the media processing device. A radio frequency identification chip may be disposed proximate the alignment recess, where the radio frequency identification chip is aligned with a radio frequency reader of the media processing device in response to the alignment recess being engaged by the alignment pin of the media processing device.

Embodiments of the present invention may include a media processing device having a base, a lid hingedly attached to the base and movable relative to the base between a closed position and an open position, a printhead assembly attached to the lid, and a ribbon positioning assembly. The ribbon positioning assembly being disposed within a cavity defined between the lid and the base, and being pivotably attached to at least one of the lid or the base. The ribbon positioning assembly is configured to move between a printing position when the lid is in the closed position and an accessible position when the lid is in the open position. The ribbon positioning assembly including at least one cartridge channel configured to receive therein a ribbon cartridge, and at least one printhead assembly channel configured to guide the printhead assembly along the printhead assembly channel in response to the lid being moved between the open position and the closed position. The printhead assembly may be pivotably attached to the lid and the printhead assembly may pivot relative to the lid in response to the lid being moved between the open position and the closed position.

According to some embodiments, the printhead assembly moves to a disengaged position relative to the ribbon positioning assembly in response to the lid moving to the open position, and the printhead assembly moves to an engaged position relative to the ribbon positioning assembly in response to the lid moving to the closed position. The ribbon positioning assembly may be configured to receive a ribbon cartridge along the at least one cartridge channel. The at least one cartridge channel and the at least one printhead channel cross one another on the ribbon positioning assembly. The ribbon cartridge may be received in a first, partially engaged position within the at least one cartridge channel, and in response to the printhead assembly moving along the at least one printhead assembly channel from the disengaged position to the engaged position, the ribbon cartridge is driven to a fully engaged position within the at least one cartridge channel.

Embodiments of the present invention may include a ribbon positioning assembly movable between a printing position and an accessible position. The ribbon positioning assembly including at least one cartridge channel configured to receive therein a ribbon cartridge, and at least one printhead channel configured to guide a printhead assembly in response to the ribbon positioning assembly being moved between the accessible position and the printing position, where the at least one printhead channel is configured to cross the at least one cartridge channel. The at least one printhead channel may be configured to guide the printhead assembly between a first spool housing and a second spool housing of a cartridge received in an installed position within the at least one cartridge channel in response to the ribbon positioning assembly being moved between the accessible position and the printing position. A ribbon cartridge received in the at least one cartridge channel is in at least one of a partially installed position or a fully installed position. In response to the ribbon cartridge being received in the at least one cartridge channel in the partially installed position, and in response to the ribbon positioning assembly moving from the accessible position to the printing position, the printhead assembly is configured to drive the ribbon cartridge from the partially installed position to the fully installed position.

A printer according to an example embodiment of the present invention may include a base and a lid hingedly attached to the base, moveable between a closed position in which the lid is secured to the base, and an open position. A cavity may be defined between the lid and the base, where the cavity is inaccessible when the lid is in the closed position and the cavity is accessible when the lid is in the open position. The printer may include a ribbon positioning assembly disposed within the cavity that is pivotably attached to at least one of the lid or the base, where the ribbon positioning assembly is configured to move between a printing position when the lid is in the closed position and an accessible position when the lid is in the open position. A printhead assembly may be attached to the lid. The printhead assembly may be pivotably attached to the lid. The printhead assembly may move to a disengaged position relative to the ribbon positioning assembly in response to the lid moving to the open position. The printhead may move to an engaged position relative to the ribbon positioning assembly in response to the lid moving to the closed position. The printhead assembly may be disposed at a first angle relative to the lid in the disengaged position, and the printhead assembly may be disposed at a second angle relative to the lid, different from the first angle, in the engaged position. The base may include a platen roller, and in response to the lid being moved from the open position to the closed position, a printhead of the printhead assembly may be brought into engagement with the platen roller.

According to some embodiments, the ribbon positioning assembly may be interchangeable between a ribbon cartridge receiving frame sub-assembly non-ribbon cartridge ribbon receiving frame sub-assembly. The ribbon positioning assembly may be configured to receive a ribbon cartridge. A ribbon feed path may be defined proximate the ribbon positioning assembly between a first spool and a second spool of the ribbon cartridge, and the printhead assembly may be driven between the first spool and the second spool in response to the lid moving from an open position to a closed position. The printhead may engage the ribbon as the printhead assembly is driven between the first spool and the second spool, and the printhead may drive the ribbon to a ribbon printing path.

According to some embodiments, the base may define a media receiving area configured to be accessible when the lid is in the open position and inaccessible when the lid is in the closed position. When the lid is in the open position and the ribbon positioning assembly in the accessible position, a center of gravity of the printer may be defined proximate the base of the printer relative to the lid and the ribbon positioning assembly. The lid may be hingedly attached to the base proximate a back of the printer and the ribbon positioning assembly may be pivotably attached to at least one of the lid or the base proximate the back of the printer. The center of gravity, in response to the lid being in the open position and the ribbon positioning assembly in the accessible position, may be defined proximate the base of the printer between about one-third the distance from the back of the printer to a front of the printer and about two-thirds the distance from the back of the printer to the front of the printer. The lid may be moved at least ninety degrees about a hinge in response to the lid being moved from the closed position to the open position.

Some embodiments of the present invention may provide a printer including a base and a lid hingedly attached to the base that is moveable between a closed position in which the lid is secured to the base, and an open position in which the lid is at least partially separated from the base. The lid and base may define a cavity therebetween, where the cavity is inaccessible when the lid is in the closed position, and the cavity is accessible when the lid is in the open position. A ribbon positioning assembly may be disposed within the cavity and pivotably attached to at least one of the lid or the base, where the ribbon positioning assembly may be configured to move between a printing position when the lid is in the closed position, and an accessible position when the lid is in the open position, where the ribbon positioning assembly includes a ribbon tension mechanism. The ribbon positioning assembly may be configured to receive therein a ribbon cartridge including a first spool and a second spool with a ribbon extending therebetween, where the ribbon tensioning mechanism may be configured to apply tension to the ribbon between the first spool and the second spool. The ribbon tensioning mechanism may be configured to maintain tension on the ribbon in response to the lid being moved from the closed position to the open position.

Embodiments may further include a printhead assembly pivotably coupled to the lid, where a printhead of the printhead assembly is disengaged from the ribbon in response to the lid being moved from the closed position to the open position. The printhead of the printhead assembly may be engaged with the ribbon in response to the lid being moved from the open position to the closed position. The printhead assembly may be disposed at a first angle relative to the lid in response to the lid being in an open position, and the printhead assembly may be disposed at a second angle relative to the lid, different from the first angle, in response to the lid being in a closed position. The ribbon printing assembly may be configured to receive therein a ribbon cartridge including a first spool and a second spool, with a ribbon extending therebetween, The printer may further include a printhead assembly pivotably coupled to the lid where in response to the lid being moved from the open position to the closed position, the printhead assembly is driven between the first spool and the second spool. The printhead assembly may include a printhead, and in response to the lid moving from the open position to the closed position, the printhead may move into a position in which the second spool is positioned substantially between the printhead and the lid. The printhead assembly may further include a convex deflector assembly and the printhead assembly may define a print line where the printhead engages the platen roller. The convex deflector assembly may be positioned upstream of the print line relative to a media feed path. The convex deflector assembly applies tension across a width of the ribbon, parallel to the print line to remove wrinkles from the ribbon as it moves along a ribbon printing path.

According to another example embodiment of the present invention, a ribbon cartridge is provided that includes a first spool housing configured to receive a first spool, a second spool housing configured to receive a second spool, and at least one frame member extending between the first spool housing and the second spool housing. A locking feature defining a locked position and an unlocked position adapted to lock the ribbon cartridge within a ribbon positioning assembly may also be provided. The ribbon cartridge may further include a spool lock, where the spool lock is configured to engage at least one of the first spool or the second spool in response to the ribbon cartridge not being received within a ribbon positioning assembly. The spool lock may be configured to disengage the at least one of the first spool or the second spool in response to the ribbon cartridge being received within a ribbon positioning assembly. The spool lock may be configured to engage both the first spool and the second spool in response to the ribbon cartridge not being received within a ribbon positioning assembly, and the spool lock may be configured to maintain a tension of a ribbon extending between the first spool and the second spool when the spool lock is engaged with the first spool and the second spool. The first spool may be a ribbon supply spool and the second spool may be a ribbon take-up spool, where a radio frequency identification chip may be disposed proximate the take-up spool.

According to some embodiments, the frame member extending between the first spool housing and the second spool housing may define a recess, where the recess of the frame member is defined by an area of the frame member that is narrower than a majority of the frame member. The frame member may include additional structural reinforcement proximate the recess relative to the majority of the frame member.

Another example embodiment of the present invention may provide a printer that includes a base and a lid hingedly attached to the base and moveable between a closed position in which the lid is secured to the base, and an open position. A cavity may be defined between the lid and the base, where the cavity may be inaccessible when the lid is in the closed position, and the cavity is accessible when the lid is in the open position. The printer may further include a ribbon positioning assembly disposed within the cavity that is pivotably attached to at least one of the lid or the base, where the ribbon positioning assembly may be configured to move between a printing position when the lid is in the closed position, and an accessible position when the lid is in the open position, where the ribbon positioning assembly includes a first pair of guide channels configured to receive therein a ribbon cartridge, and a second pair of guide channels. The printer may include a printhead assembly attached to the lid, where the printhead assembly engages the second pair of guide channels and translates within the guide channels in response to the lid being moved between the closed position and the open position.

According to some embodiments, the printhead assembly may be pivotably attached to the lid. The printhead assembly may move along the second pair of guide channels to a disengaged position relative to the ribbon positioning assembly in response to the lid moving to the open position, and the printhead may move along the second pair of guide channels to an engaged position relative to the ribbon positioning assembly in response to the lid moving to the closed position. The printhead assembly may be disposed at a first angle relative to the lid in the disengaged position, and the printhead assembly may be disposed at a second angle relative to the lid, different from the first angle, in the engaged position. The base may include a platen roller, and in response to the lid being moved from the open position to the closed position, a printhead of the printhead assembly may be brought into engagement with the platen roller.

According to some embodiments, the printer may include a ribbon feed path defined proximate the ribbon positioning assembly between a first spool and a second spool of the ribbon cartridge, and the printhead assembly may be driven between the first spool and the second spool in response to the lid moving from an open position to a closed position. The printhead may engage the ribbon as the printhead assembly is driven between the first spool and the second spool.

According to another embodiment of the present invention, a printer may be provided including a base, a platen assembly supported proximate the base, a lid hingedly attached to the base movable between a closed position in which the lid is secured to the base, and an open position, and a ribbon positioning assembly. The ribbon positioning assembly may be disposed within the cavity and may be pivotably attached to at least one of the lid or the base, where the ribbon positioning assembly is configured to move between a printing position when the lid is in the closed position, and an accessible position when the lid is in the open position, where a media access gap is defined between the ribbon positioning assembly and the platen assembly for accessing a media supply. The media access gap may be sized to receive there through a supply of media. In response to the ribbon positioning assembly being moved to the closed position, the media access gap may be closed to define a media feed path along which media travels during printing. In response to the ribbon positioning assembly being moved to the closed position, at least a portion of the media and at least a portion of the ribbon are captured between a printhead and the platen assembly.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 6:
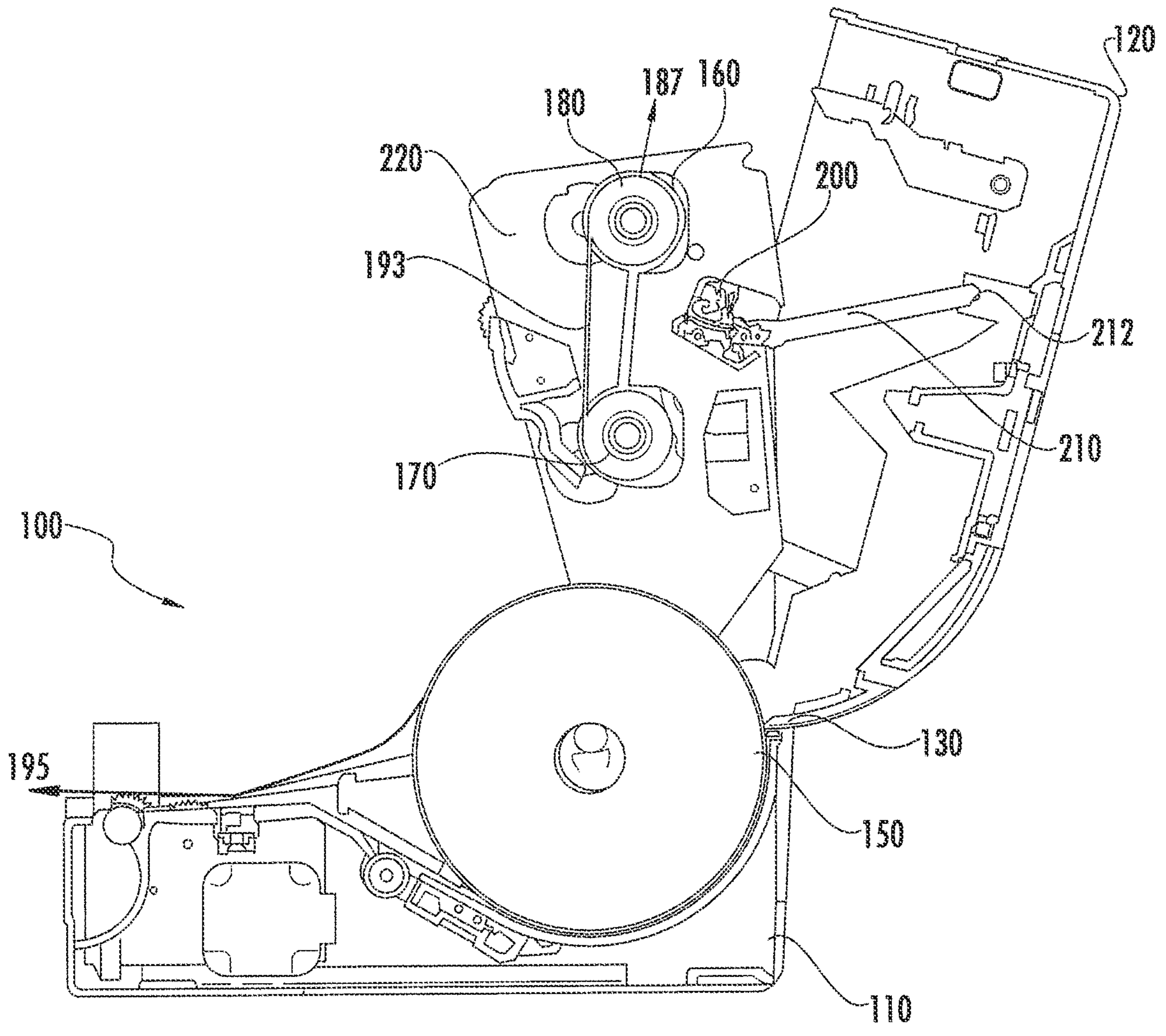
FIG. 6 illustrates a cross-section view of a media processing device in the open position according to an example embodiment of the present invention.
Figure 7:
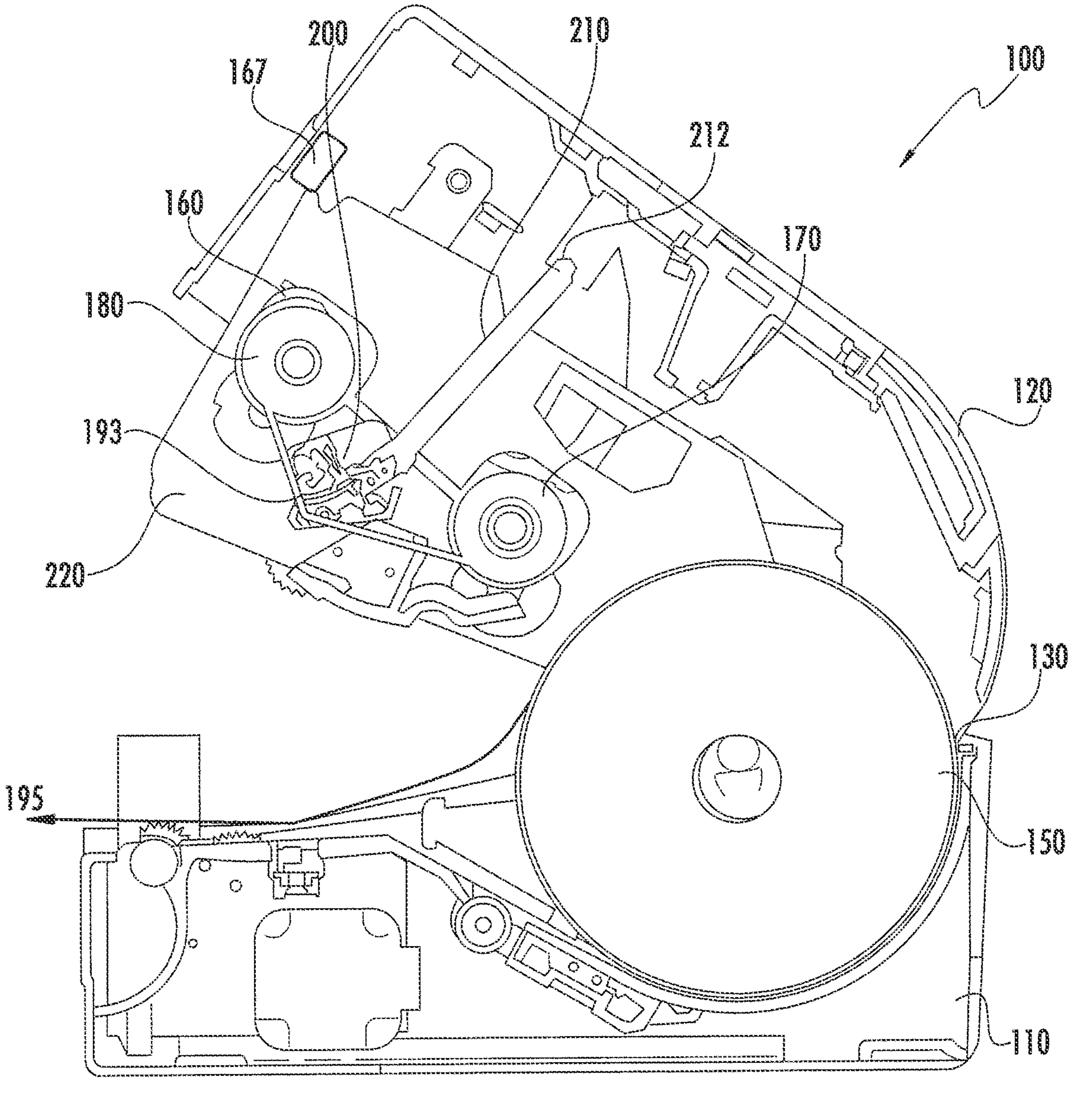
FIG. 7 illustrates a cross-section view of the media processing device of FIG. 6 with the lid between the open position and the closed position.
Figure 10C:
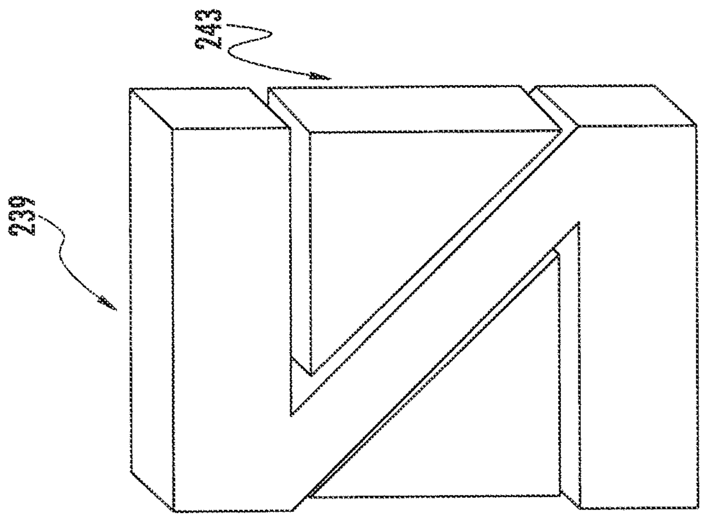
Figure 10B:
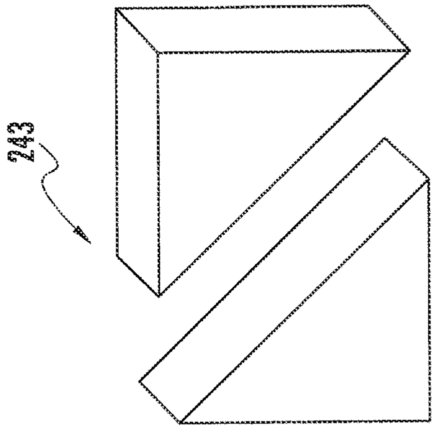
Figure 10A:
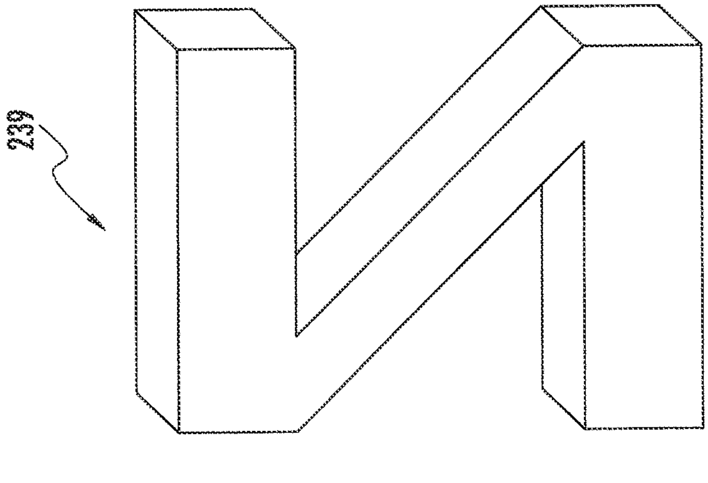
Figure 11:
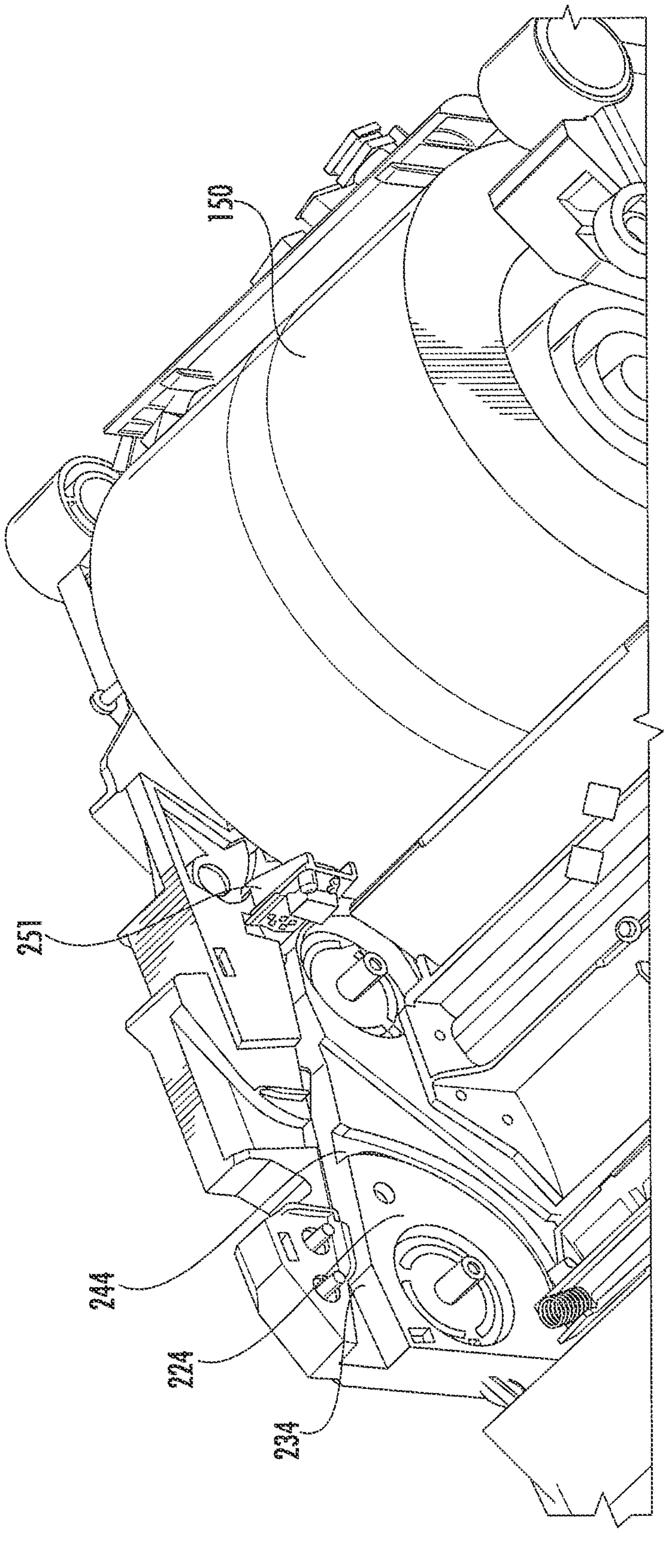
Figure 12:
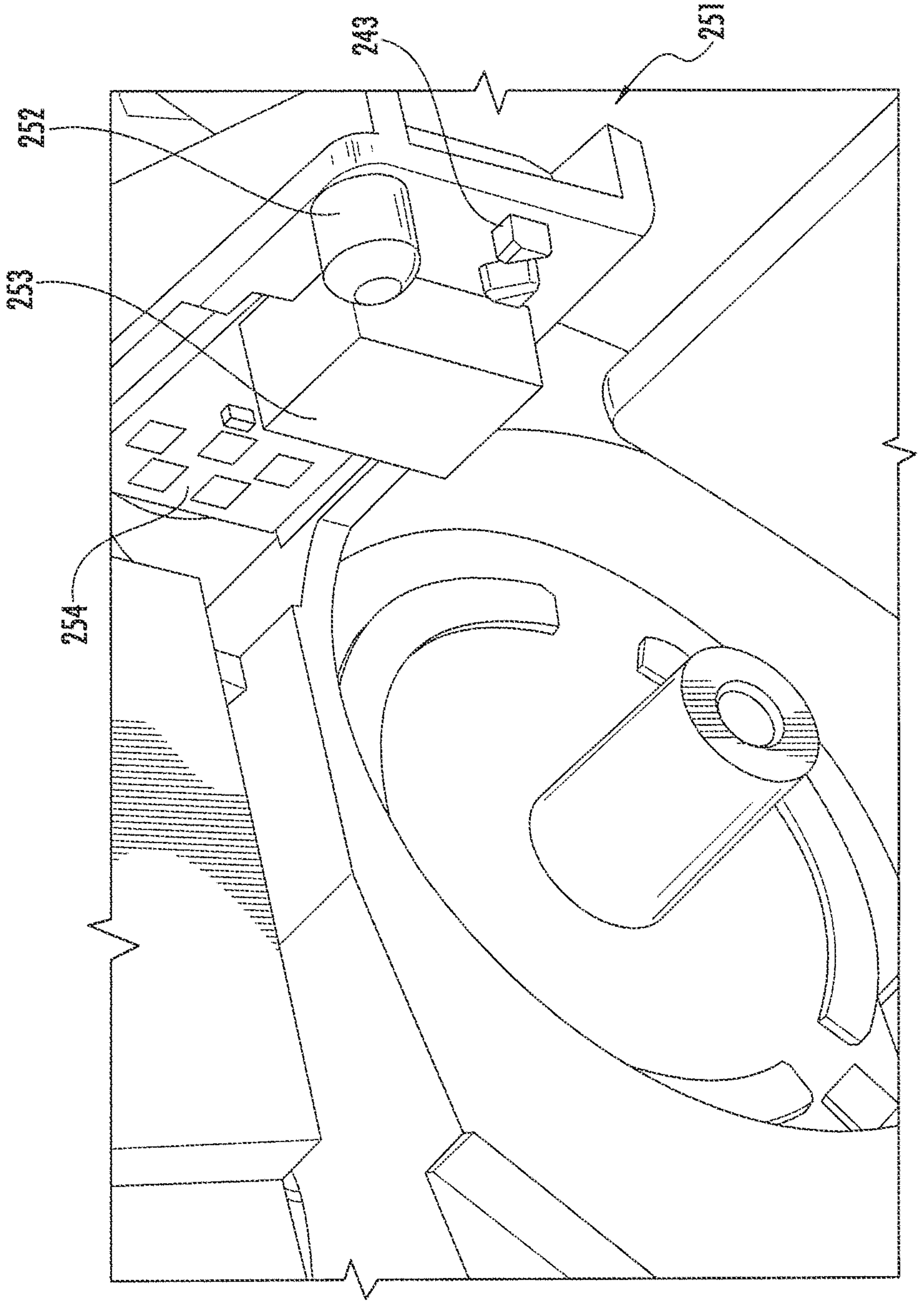
Figure 13:
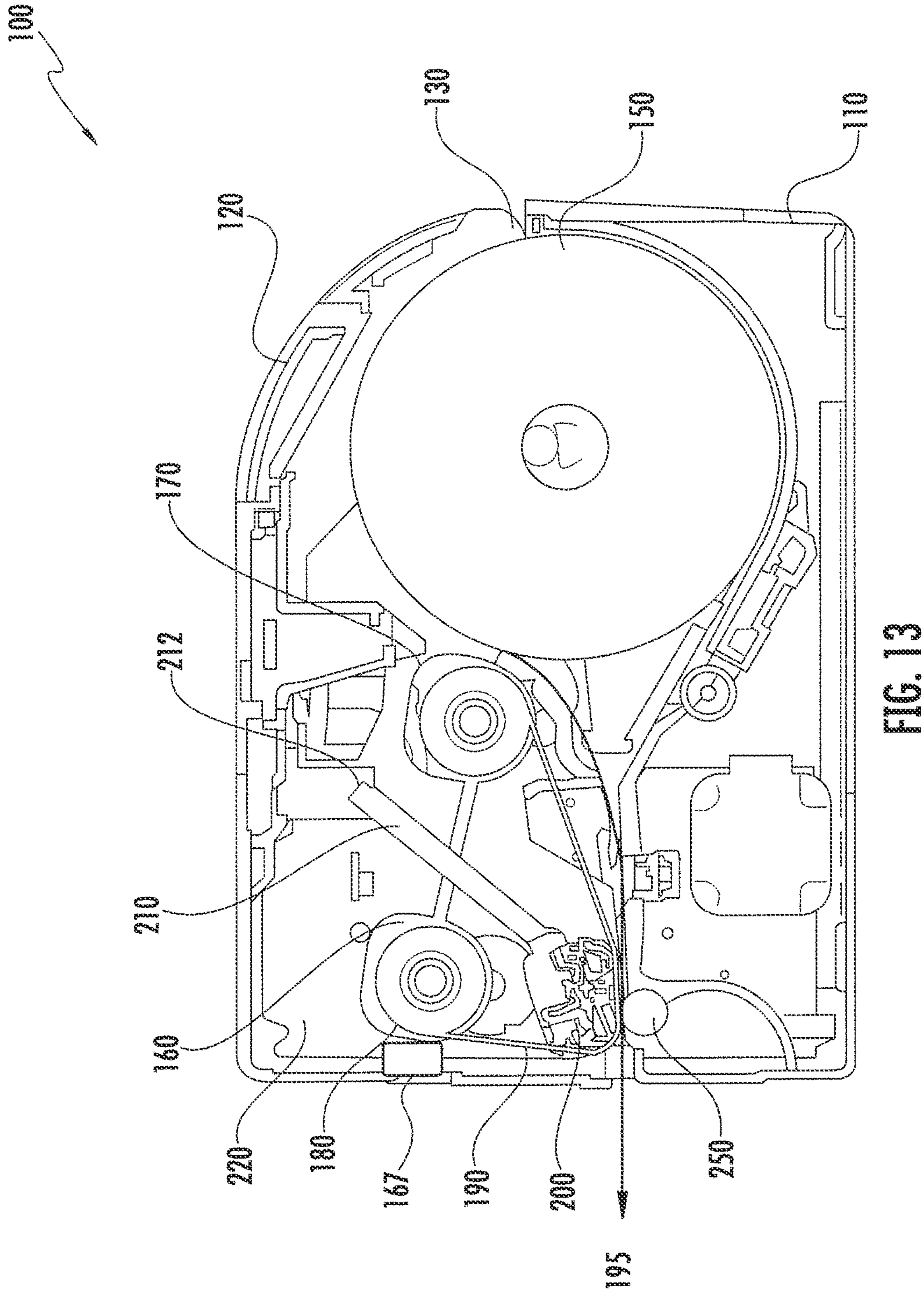
Figure 14:
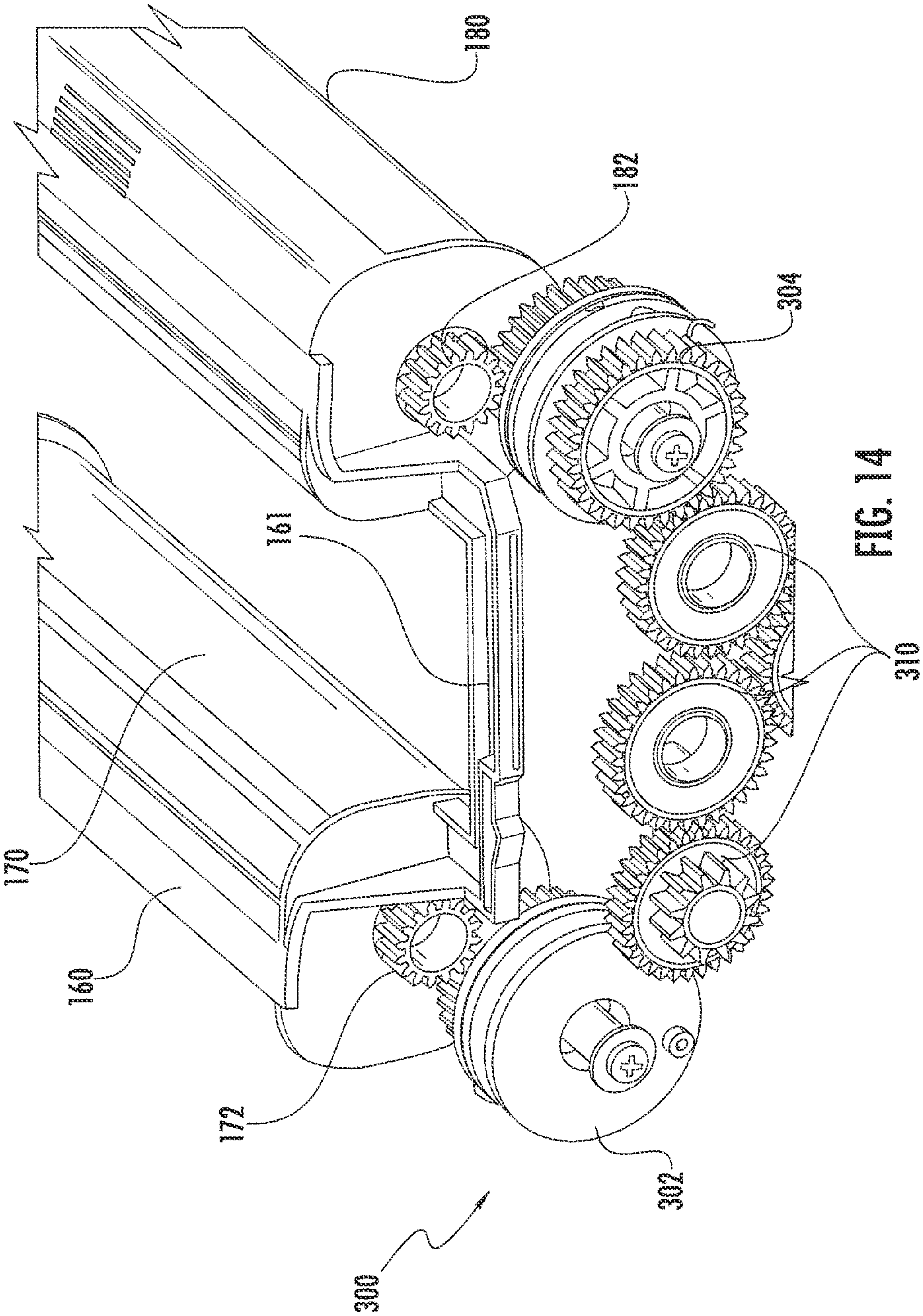
Figure 15:
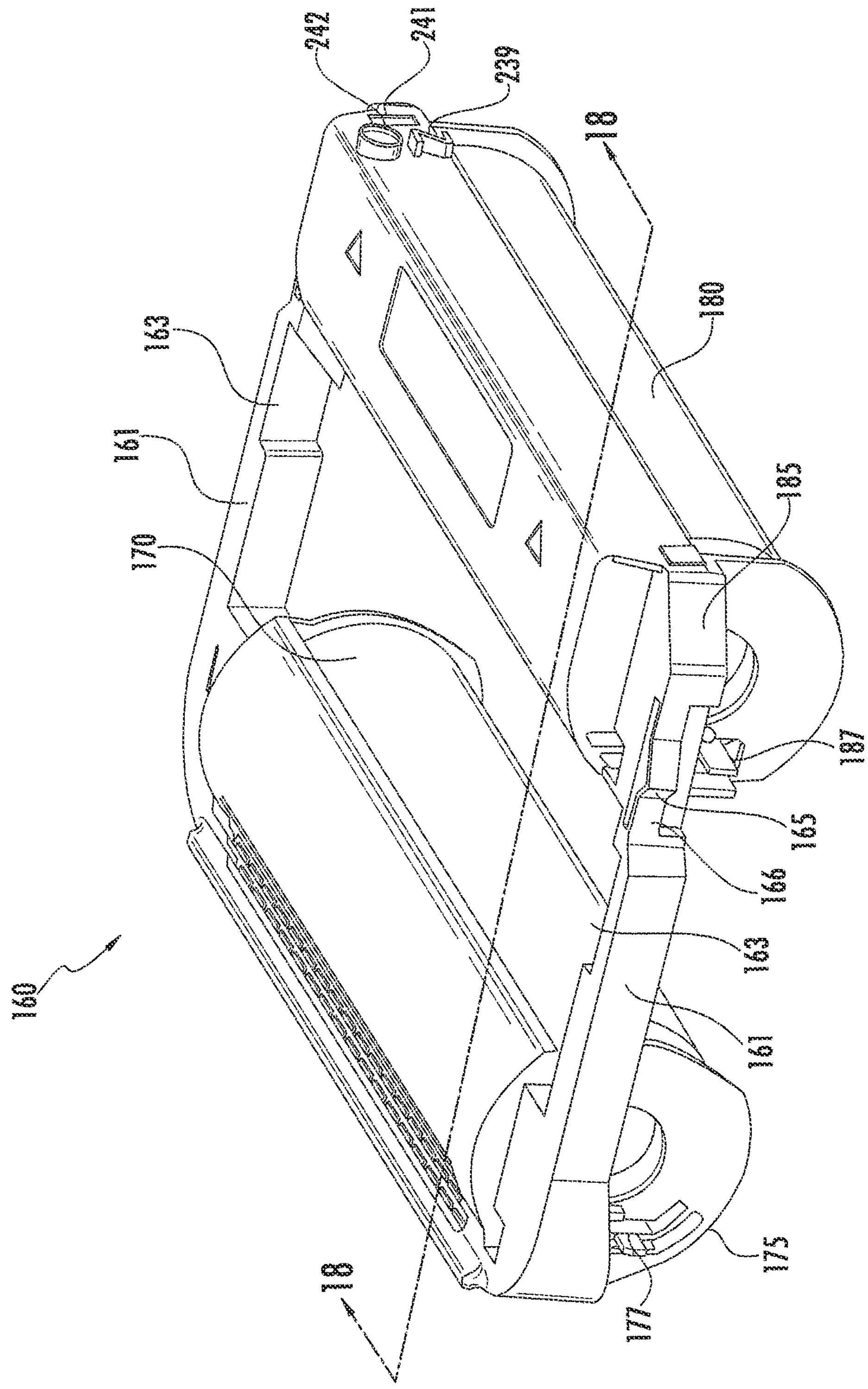
Figure 16:
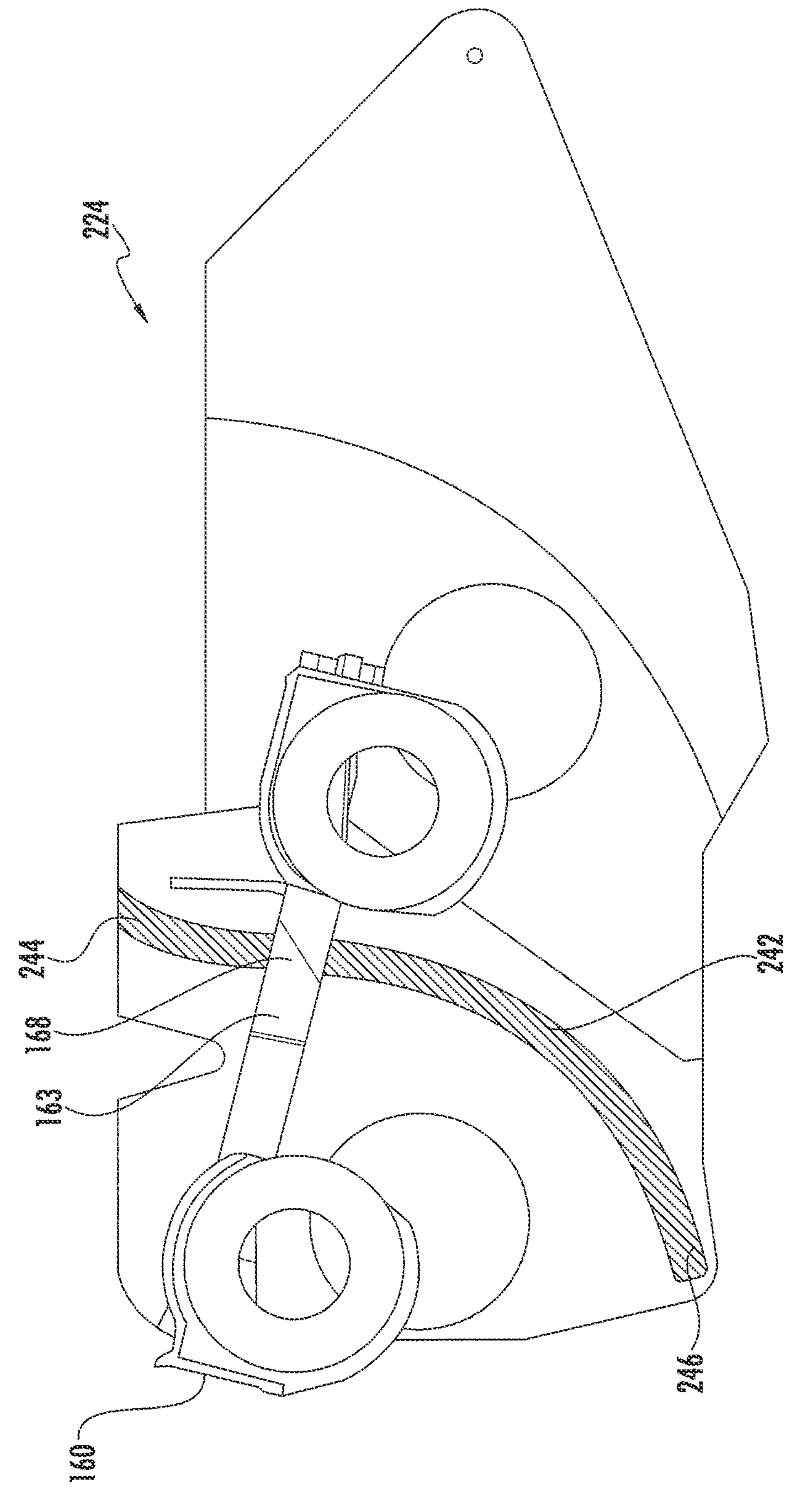
Figure 17:
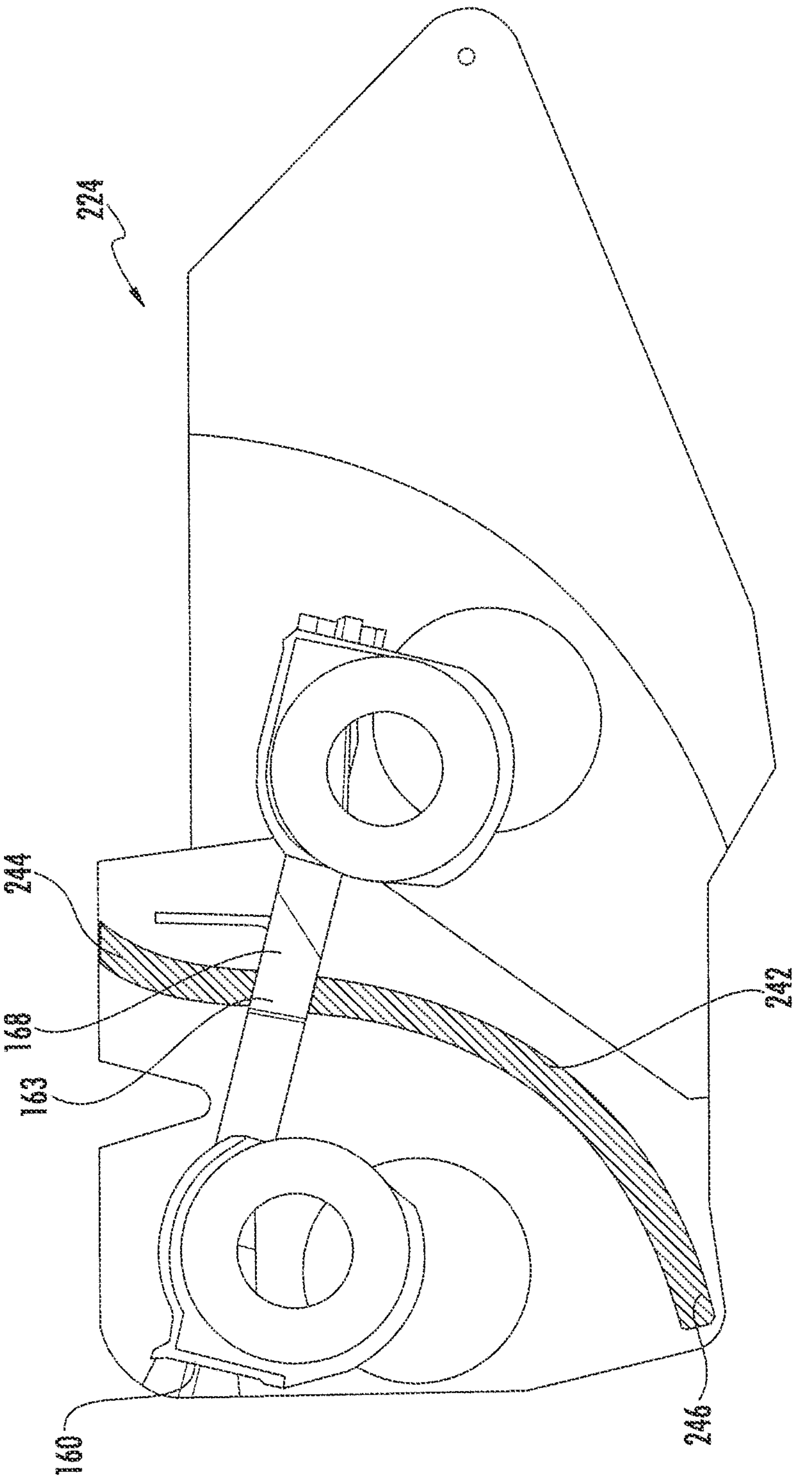
Figure 18:
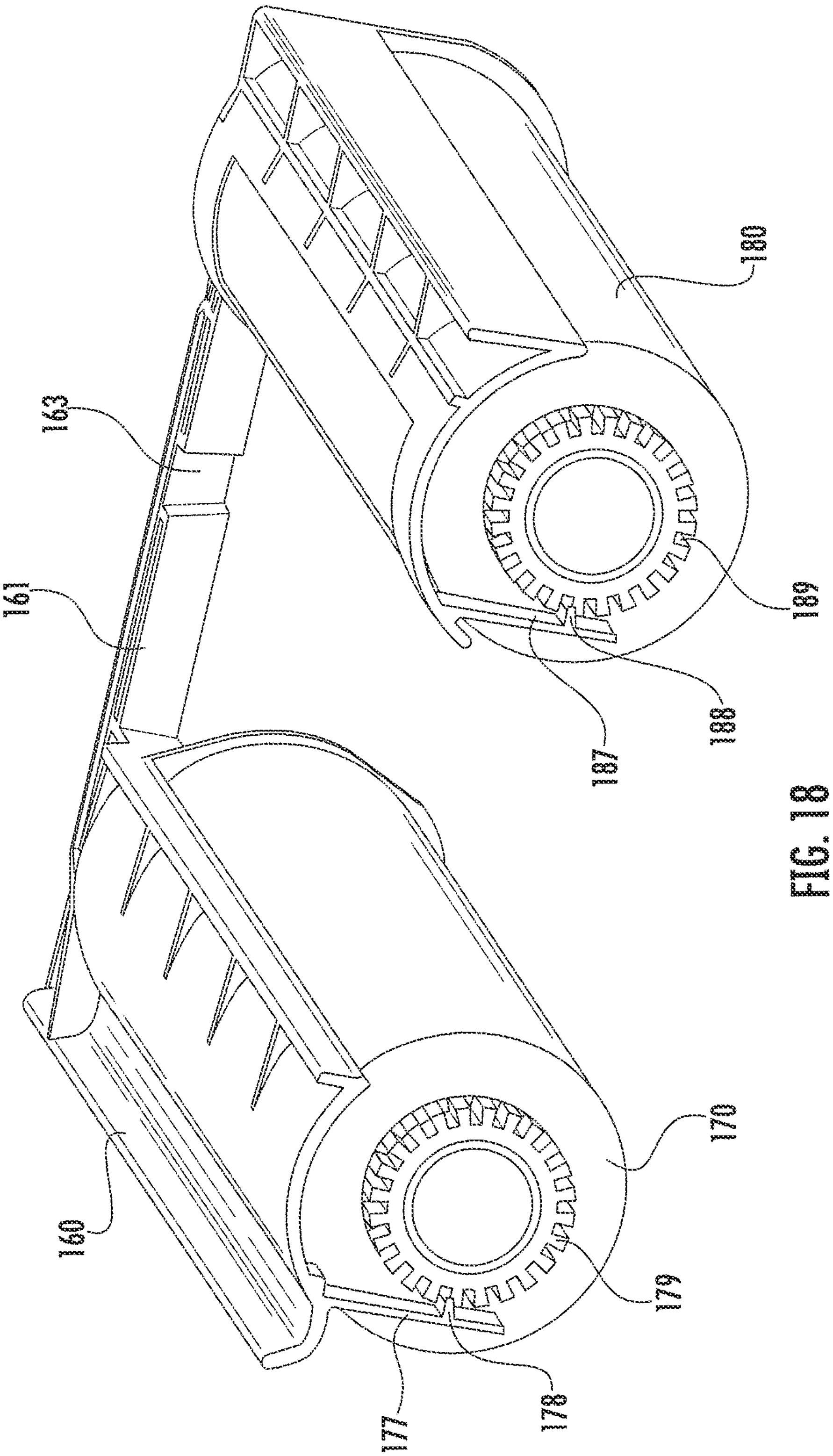
Figure 19:
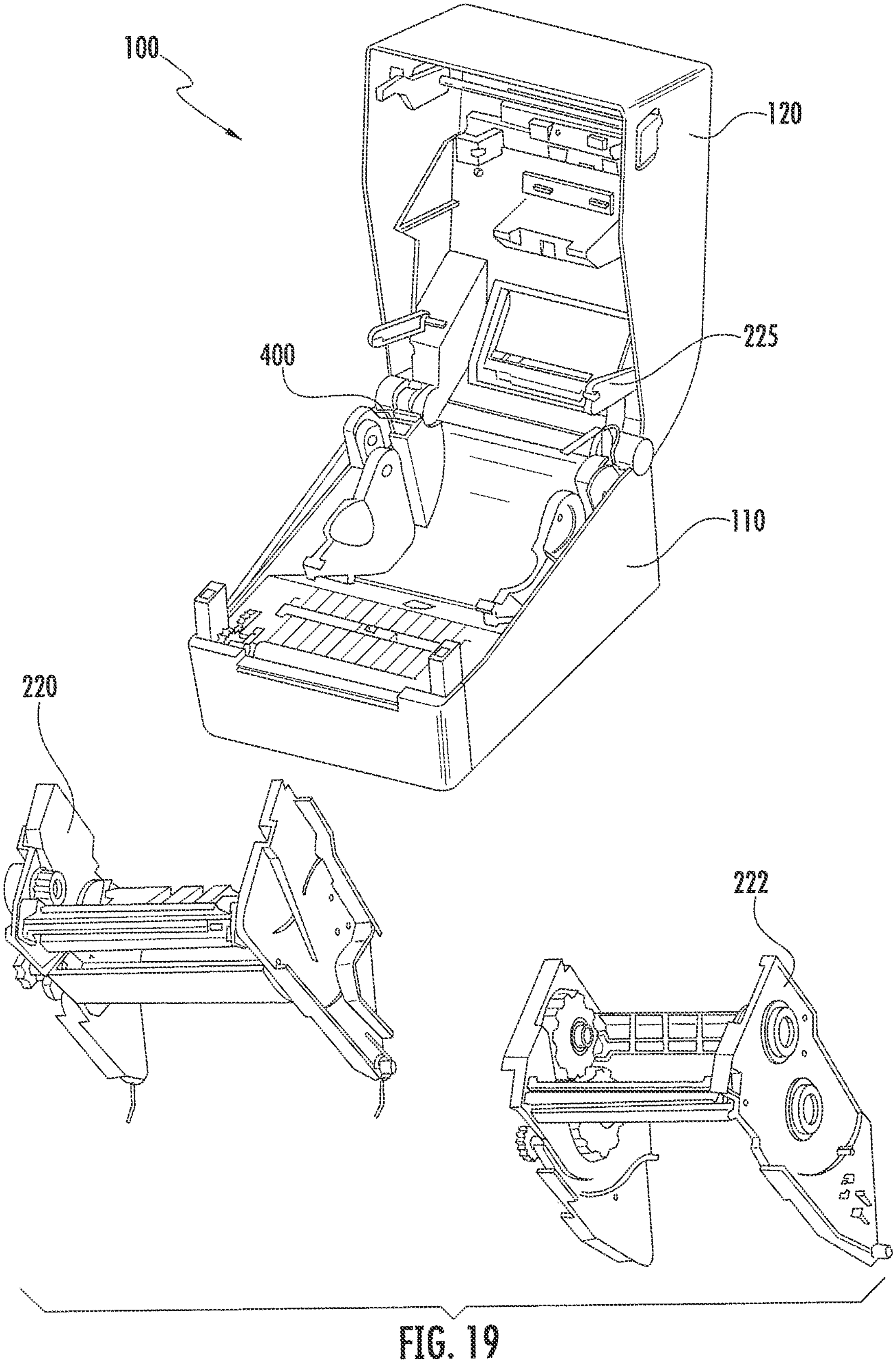
Figure 20:
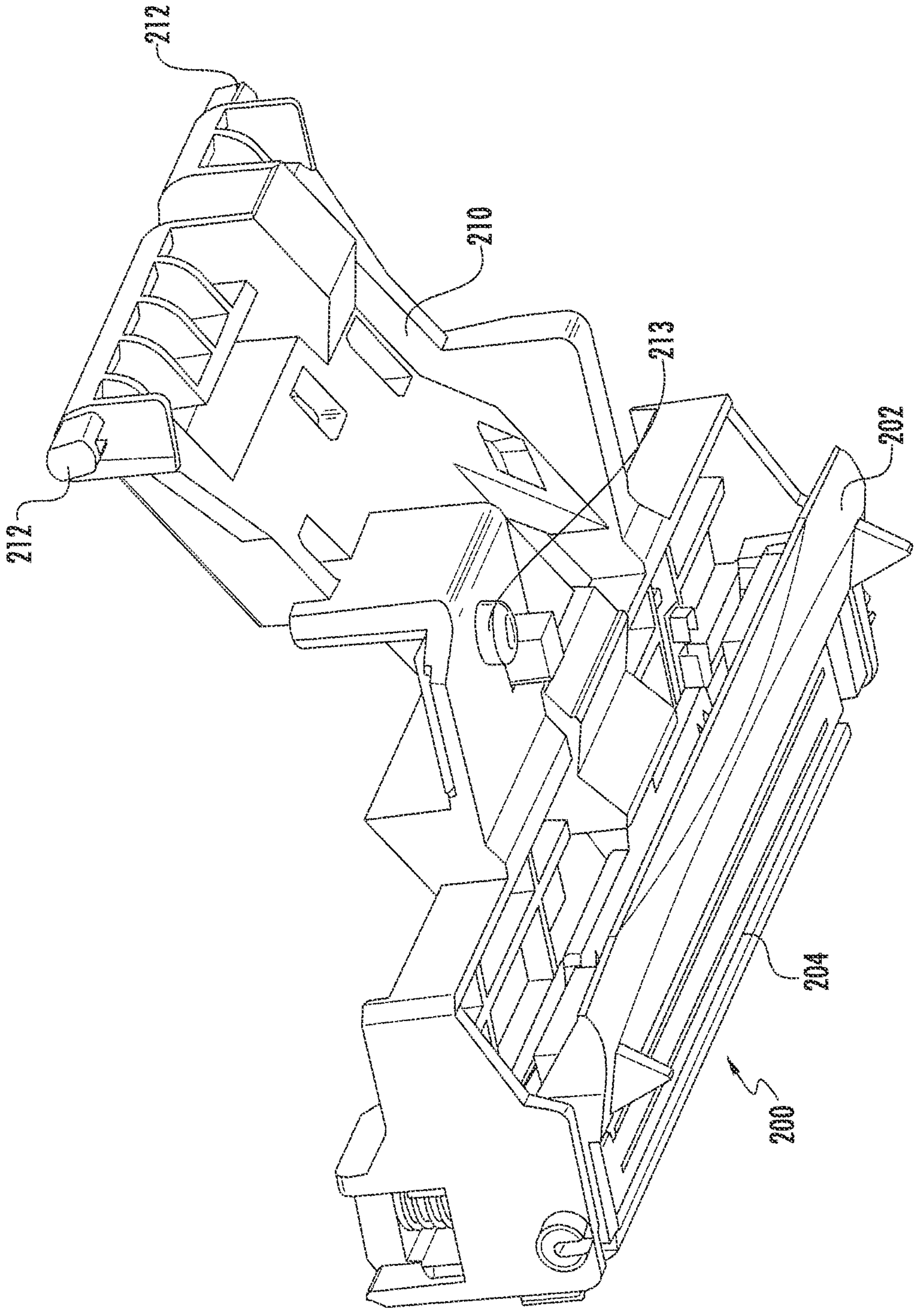
Figure 21:
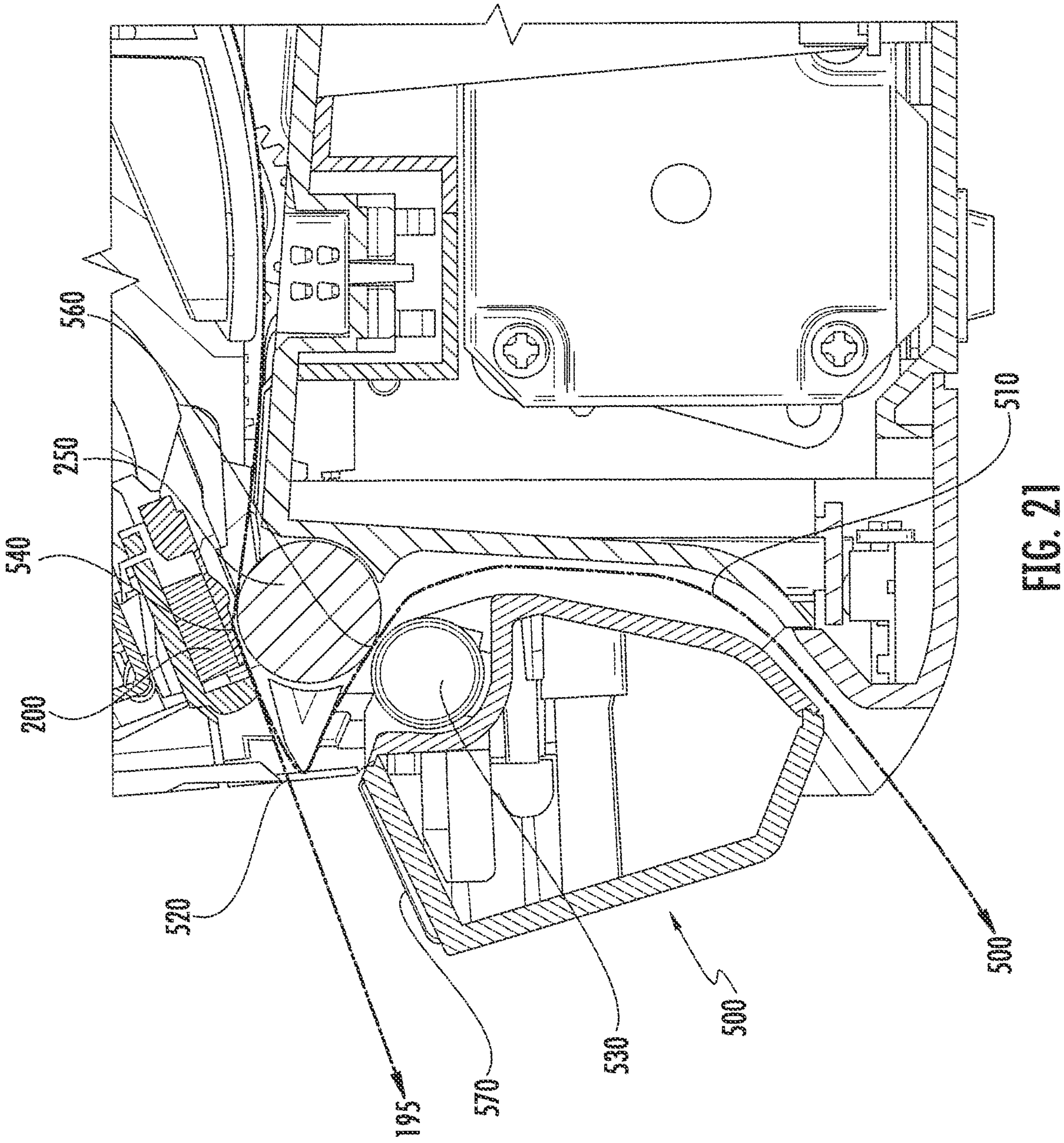
Figure 22:
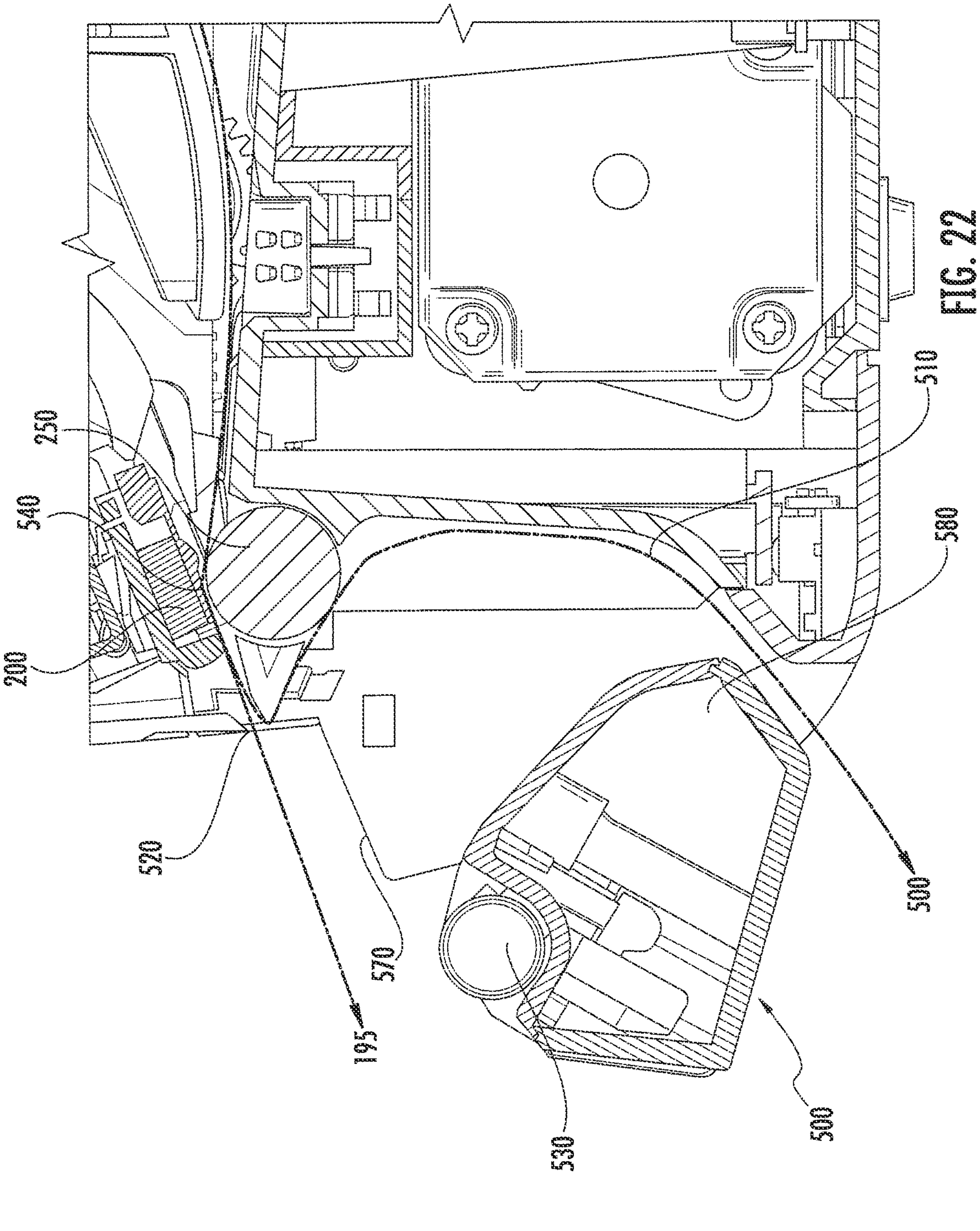

FIG. 10A-C illustrates a detail view of a raised member engaging a raised surface according to an example embodiment of the present invention;

FIG. 11 illustrates a detail view of a ribbon positioning assembly according to an example embodiment of the present invention;

FIG. 12 illustrates another detail view of a ribbon positioning assembly according to an example embodiment of the present invention;

FIG. 13 illustrates a cross-section view of the media processing device of FIGS. 6 and 7 with the lid in the closed position relative to the base;

FIG. 14 illustrates a detail view of the ribbon tension mechanism and the ribbon driving gear train according to an example embodiment of the present invention;

FIG. 15 illustrates a detail view of the spool lock mechanism according to an example embodiment of the present invention;

FIG. 16 illustrates a cross-section view of a ribbon cartridge being received within a ribbon positioning assembly in the partially installed position according to an example embodiment of the present invention;

FIG. 17 illustrates a cross-section view of a ribbon cartridge being received within a ribbon positioning assembly in the fully installed position according to an example embodiment of the present invention;

FIG. 18 illustrates a cross-section view of the spool lock mechanism of FIG. 15 taken along section line 18-18;

FIG. 19 illustrates a media processing device including two interchangeable ribbon positioning assemblies according to an example embodiment of the present invention;

FIG. 20 illustrates a printhead assembly having a deflector configured to reduce ribbon wrinkle according to example embodiments of the present invention;

FIG. 21 illustrates a modular peeling mechanism as in the peeling position as attached to a media processing device according to an example embodiment of the present invention; and FIG. 22 illustrates a modular peeling mechanism in a loading position as attached to a media processing device according to an example embodiment of the present invention.

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Printers and media processing devices may be configured to print and/or encode media drawn from a roll or spool. Such media may include a web supporting a plurality of individually cut media components, such as adhesive-backed and carrier-supported labels, or the media may be a continuous web such as a spool of linerless label media or direct thermal media. Printers process (e.g., print, encode, etc.) the media by drawing the media from the spool and routing the media proximate various processing components (e.g., printhead, RFID reader/encoder, magnetic stripe reader/encoder etc.). Processing the media from a spool may facilitate a continuous or batch printing process.

From time to time, printers exhaust the available supply of media such that a user must replace the media supply spool. Other consumables such as ribbon or ribbon cartridges, printheads, and the like must also be periodically replaced. Replacing consumable components of a media processing device can often be complex and arduous, with the time to replace such components resulting in costly downtime of the media processing device. Replacement of consumable components can be even more difficult for media processing devices of relatively small form factors, such as desktop or mobile printers, as the components are generally tightly packaged into a relatively small housing. As such, it may be desirable for a media processing device to provide easy access to the consumable components therein to facilitate relatively quick and easy replacement of consumable components, particularly for a media processing device including a small form factor.

Embodiments of the present invention are directed to an improved media processing device that is structured to enhance user serviceability and simplify replacement of consumable components. Such embodiments are configured to provide these advantages while maintaining a compact size.

Figure 1:
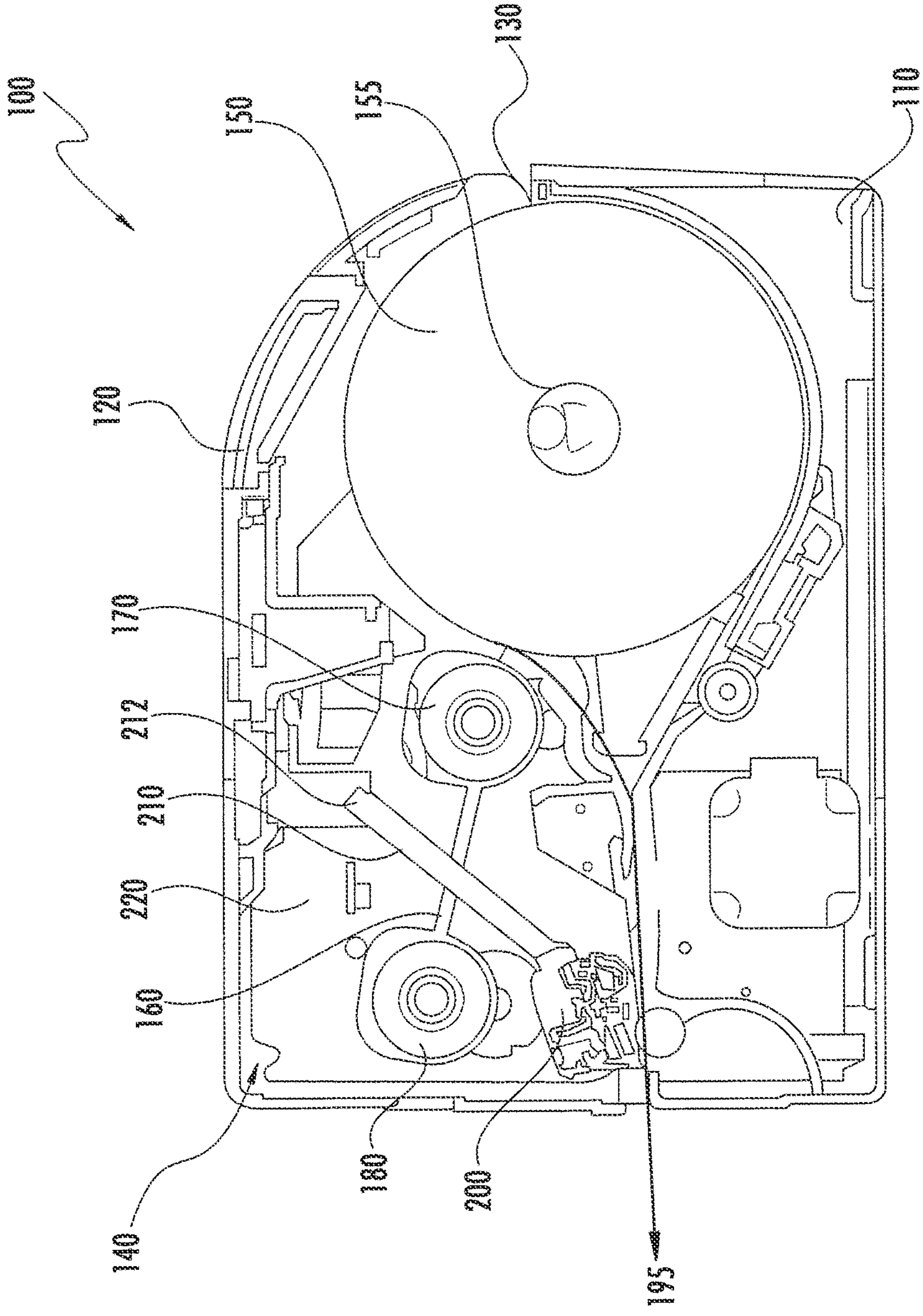
FIG. 1 illustrates a cross-section view of a media processing device according to example embodiments of the present invention.

FIG. 1 illustrates a media processing device according to example embodiments of the present invention. The illustrated embodiment depicts a cross-section of a media processing device 100 in profile, as viewed perpendicularly to a media feed path 195. While the illustrated embodiments and description provided herein are directed primarily to a printing device, other media processing devices such as media encoders, label applicators, or laminators, may benefit from the mechanisms described. Further, an example embodiment of the present invention may provide printing, encoding, and/or laminating functionality in a single device.

The media processing device 100 of FIG. 1 includes a housing with a base 110 and a lid 120. According to the illustrated embodiment, the lid 120 and the base 110 are arranged in a closed position in which the lid 120 is secured to the base 110. The lid 120 may be hingedly attached to the base 110 along a hinge 130, which may be located, for example, along a back side of the media processing device. According to some embodiments, a cavity 140 may be defined between the lid 120 and the base 110. The cavity may be inaccessible when the lid 120 is closed relative to the base 110 as shown in FIG. 1; however, the cavity 140 may be accessible to a user when the lid 120 is moved to an open position relative to the base 110 as will be described further below.

Figure 2:
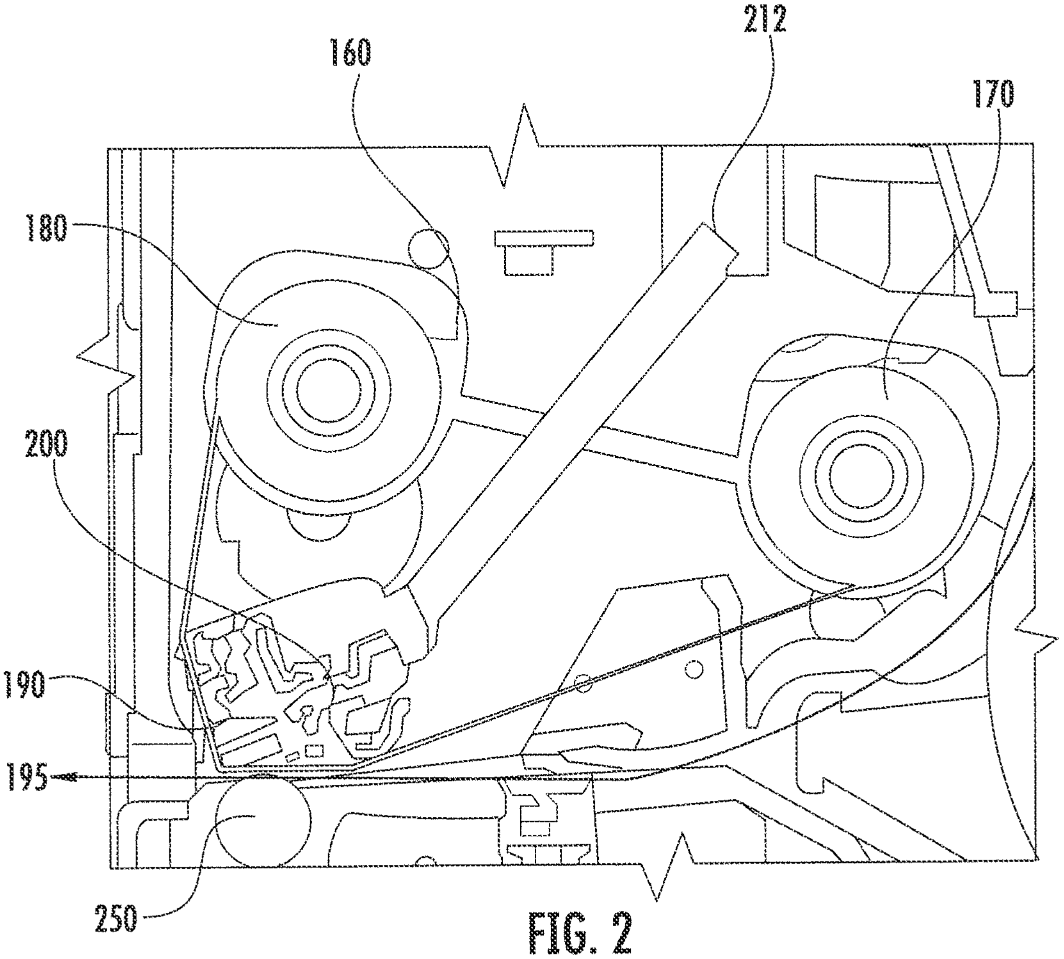
FIG. 2 illustrates a detail view of a ribbon cartridge and a printhead engaged with a ribbon according to an example embodiment of the present invention.

Within the cavity 140 of example embodiments may be a media receiving area in which a spool of media 150 may be received. A media spool 150 may be received, for example, on a media spindle 155 as shown in FIG. 1. While the illustrated embodiment of FIG. 1 includes a spool of continuous media, embodiments of the invention may also be configured to receive fan-fold media stacks, a stack or cartridge of individual media units (e.g., RFID cards), or the like. The cavity 140 may also be configured to receive a ribbon or ribbon cartridge therein. The embodiment of FIG. 1 illustrates a ribbon cartridge 160 that includes a first spool 170 (e.g., a media supply spool) and a second spool 180 (e.g., a media take-up spool). A ribbon may extend from the first spool 170, around a printhead 200 along a ribbon printing path 190 as shown in FIG. 2, which is a detail view of the printhead 200 and ribbon cartridge 160. The ribbon printing path 190 may extend between the printhead 200 and a platen roller 250 and a media feed path may extend from a media supply (e.g., media supply spool 150) along arrow 195 between the printhead 200 and the platen roller 250.

Referring back to FIG. 1, the printhead 200 may be coupled to printhead assembly 210 which extends from the lid 120 and may be pivotably coupled to the lid (e.g., at 212) as will be described further below. Embodiments of the present invention may further include a ribbon positioning assembly 220 disposed within cavity 140, where the ribbon positioning assembly is configured to pivot relative to the base 110 in general (but not necessarily absolute) concert with the lid 120 in order to provide access to the ribbon cartridge 160 and media feed path 195 as detailed further below. While embodiments illustrated herein include a ribbon positioning assembly 220 coupled to the lid 120 such that the ribbon position assembly 220 moves to an accessible position in response to the lid 120 moving to the open position, alternative embodiments may include a ribbon positioning assembly 220 that is decoupled from the lid and is movable independently between a closed, printing position, and an open, accessible position.

The printhead assembly 210 may further include a ribbon-out sensor 213 configured to detect a ribbon-out condition or a ribbon-missing condition. The ribbon-out sensor 213 is arranged with a line-of-sight 214 of the ribbon 189 as it advances along the ribbon feed path 190. The ribbon-out sensor 213 is configured to detect a specific ribbon material that is disposed at the end of the ribbon such that as the ribbon is consumed, upon reaching the end of the ribbon, the specific ribbon material is drawn along the feed path 190 and is detected by the ribbon-out sensor 213. This specific ribbon material may include a metallic material that is reflective such that the ribbon-out sensor 213 may detect a predetermined amount of reflected light to signal to the ribbon-out sensor 213 that the ribbon 189 has been consumed. Upon detection of the ribbon-out condition by the ribbon-out sensor 213, a signal may be sent to the media processing device controller to indicate that printing must be stopped until the ribbon is replaced.

The ribbon-out sensor 213 may also be configured to detect a ribbon-missing condition. The media guide 230, which will be described further below, may include a surface 215 that mimics the specific ribbon material that indicates a ribbon-out condition. For example, if the specific ribbon material is a metallic, reflective material, the surface 215 may include a mirror or material with similar properties as the specific ribbon material. This surface 215 may mimic the ribbon-out condition when a ribbon cartridge 160 is not installed in the media processing device 100. Thus, when the surface 215 is detected by the sensor 213, a ribbon-out condition is sensed and printing is not permitted. Further, this ribbon-out or ribbon-missing condition can be used in conjunction with an RFID sensor configured to detect the RFID chip of a ribbon cartridge 160. In order for the media processing device to allow printing, the sensor 213 must not detect a ribbon-out or ribbon-missing condition, and the RFID sensor must detect a properly authenticated RFID chip of a ribbon cartridge. The authentication of the RFID chip may be performed by a media processing device controller, which may also determine the media processing device cartridge 160 type, printing properties (e.g., printhead temperature, speed, etc.).

Figure 3:
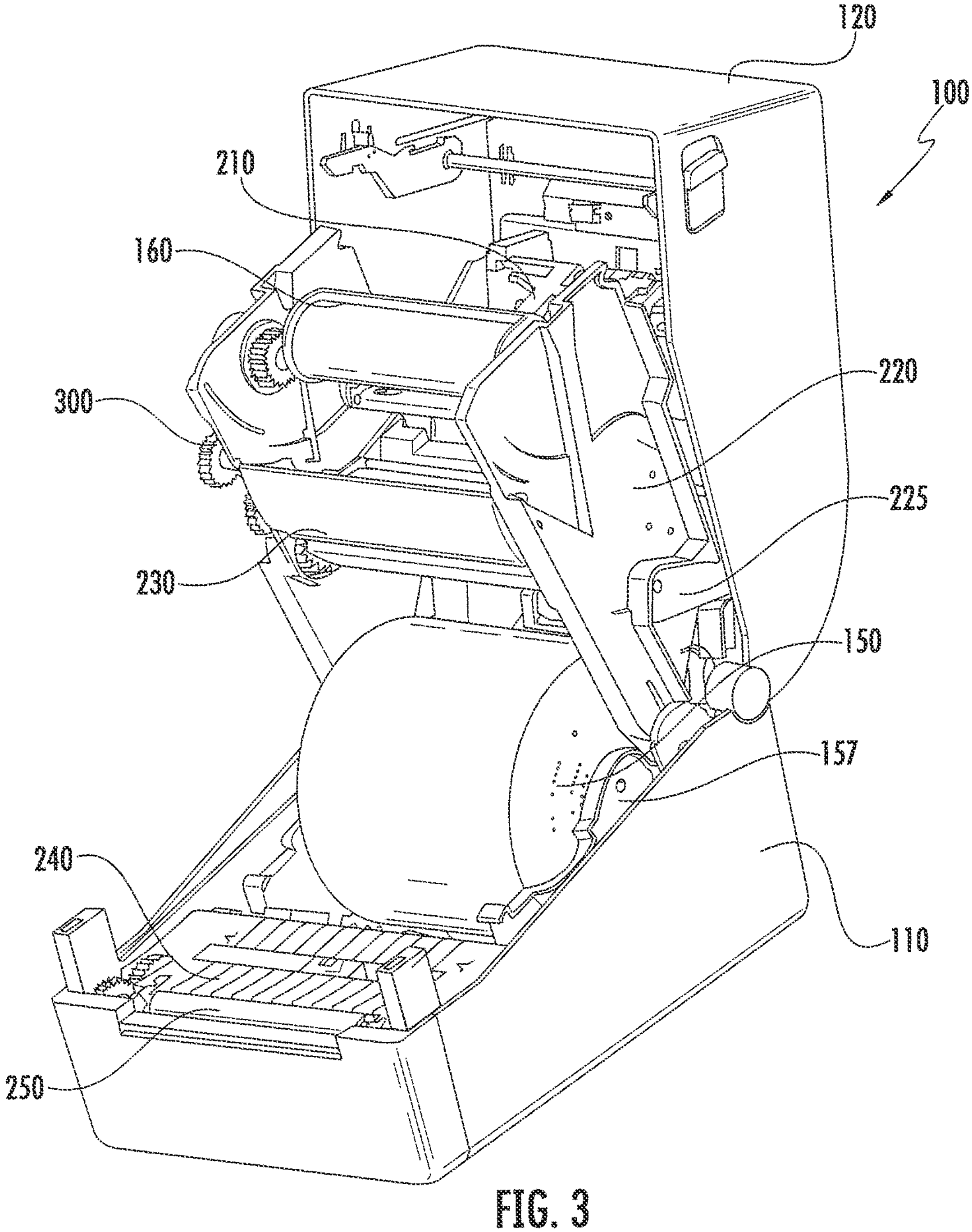
FIG. 3 illustrates a media processing device with a lid in an open position and a ribbon positioning assembly in an accessible position according to an example embodiment of the present invention.

FIG. 3 illustrates an example embodiment of the present invention with the lid 120 of the media processing device 100 disposed in the open position. As shown, the lid 120 in the open position is opened to around 100 degrees relative to the base 110, and in some cases, may open beyond 100 degrees relative to the surface on which the base 110 is situated. The lid 120 may be biased toward the open position by, for example, a torsion spring disposed proximate the hinge 130. The ribbon positioning assembly 220 may be connected to the lid 120, for example, by linkage 225, such that the ribbon positioning assembly 220 is moved to an accessible position (as shown in FIG. 3) in response to the lid 120 moving to the open position. The linkage 225 connecting the lid 120 to the ribbon positioning assembly 220 may allow the lid to open to an angle of around 100 degrees while the ribbon positioning assembly 220 opens to an angle that is somewhat less than that of the lid, such as about 80 degrees relative to the surface on which the base 110 is situated, in order to provide access to the ribbon cartridge 160 within the ribbon positioning assembly. As noted above, according to some embodiments of the invention, the ribbon positioning assembly 220 may not be connected to the lid 120 and may be separately movable to the accessible position when the lid 120 is in the open position; however, embodiments in which the ribbon positioning assembly 220 and the lid 120 are mechanically coupled may allow for simpler, single-step access to a ribbon cartridge in the ribbon positioning assembly 220 and/or access to the media 150 without requiring additional steps.

Embodiments of the present invention may provide a media processing device that remains stable when the lid 120 is in the open position and the ribbon positioning assembly 220 is moved to the accessible position. The center of gravity of the media processing device may be low and proximate a mid-point between the front of the media processing device 100 and the back of the media processing device when the lid 120 is in the closed position. In the open position, the center of gravity may be shifted toward the back of the media processing device, but the center of gravity may remain within the middle third of the media processing device along its length, and the center of gravity may remain low, positioned substantially within a cavity defined by the base 110 and below an upper perimeter edge defined by the base. Positioning the center of gravity within the base 110 may maintain a stable media processing device balance during loading/unloading of consumables from the media processing device 100.

In the accessible position, with the lid 120 in the fully opened position, the ribbon positioning assembly 220 may provide access to the ribbon cartridge 160 to allow the ribbon cartridge to be removed from and/or replaced within the ribbon positioning assembly. As will be further detailed below, the ribbon cartridge 160 may include aligning features and the ribbon positioning assembly may include complementary aligning features defined by the first and second side rails 161 of the ribbon cartridge which allow the ribbon cartridge to be received in a repeatable and accurate position within the ribbon positioning assembly, as will be described further below. The slots in the ribbon positioning assembly 220 into which the cartridge slides in provide very accurate positioning controls for the cartridge within a tight tolerance. The hard stop at the end slot of the ribbon positioning assembly 220 give a very reliable position to the cartridge each and every time it is inserted.

When the lid 120 is in the open position of FIG. 3, the media supply 150 may be accessible to a user for replacement. A media access gap may be defined between the ribbon positioning assembly 220 and the base 110 when the lid 120 and the ribbon positioning assembly 220 are in the open position. This media access gap may allow a supply of media to be easily placed within the base 110. The media supply 150 may be retained within media supply holder 157 which may include a pair of variably spaced members configured to hold a variety of widths of media supplies. The media supply holders 157 may further be configured with features to hold a spool of media therebetween and to allow rotation of the media spool as the media is fed along a media path (e.g., media path 195 of FIG. 2). The media path may be defined between a first media guide 230, which may be attached to the ribbon positioning assembly 220, and a second media guide 240 which may be connected to the base 110. With one media guide 230 disposed on the ribbon positioning assembly 220 and the other on the base 110, the media feed path 195 may be opened to an accessible position in response to the lid 120 being moved to an open position. Such a feature may allow media to be easily received within the cavity 140 of the media processing device 100 and may permit easy initial feeding of the media 150 along the media feed path. This arrangement precludes the conventional "threading" of media through narrow gaps as is conventionally required.

Figure 4:
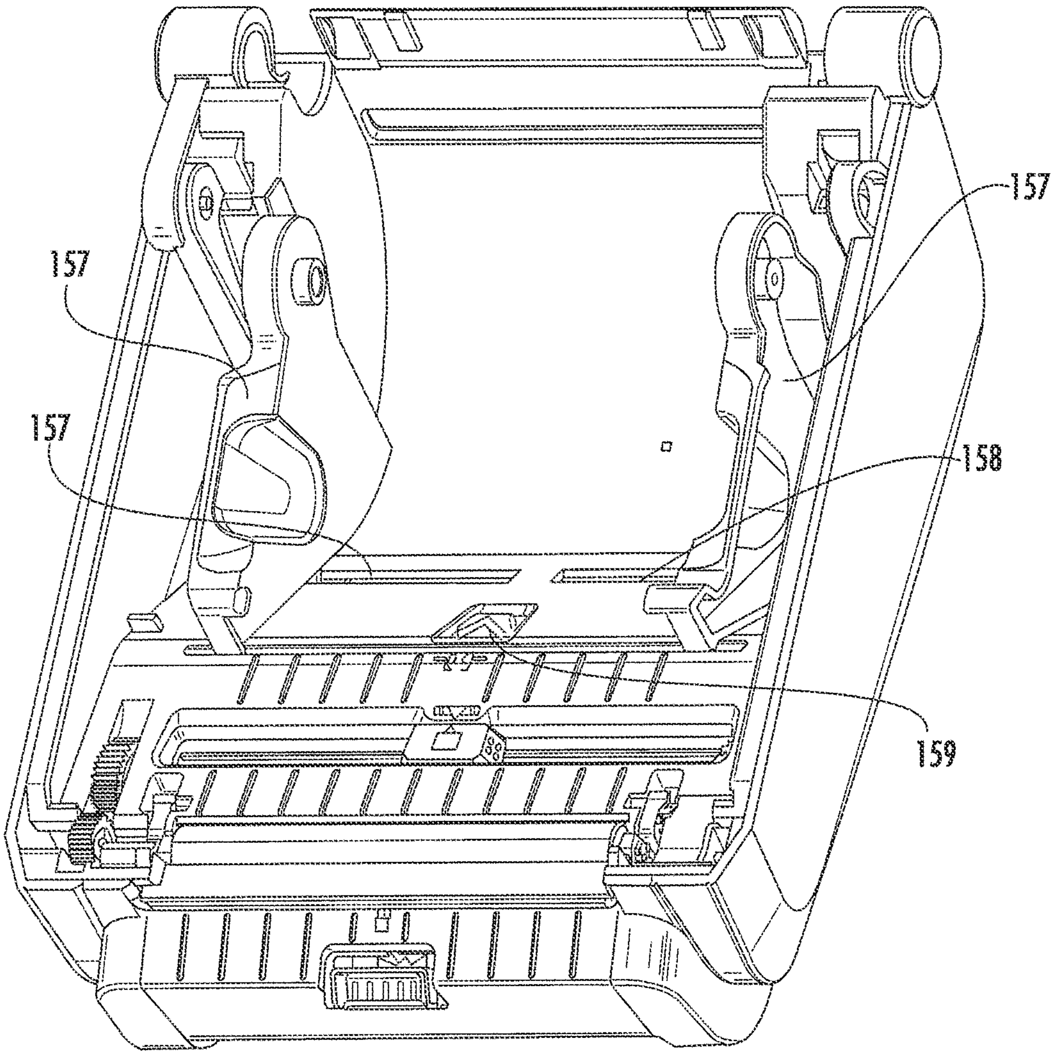
FIG. 4 illustrates a media processing device with the lid and ribbon positioning assembly removed for ease of illustration according to an example embodiment of the present invention.

FIG. 4 illustrates an example embodiment of a media processing device according to the present invention with the lid 120 and ribbon positioning assembly 220 removed for ease of understanding. In the illustrated embodiment, the media supply holders 157 are engaged with slots 158 such that the media supply holders can move toward and away from one another in order to accommodate media of various widths. The media supply holders may be spring biased toward one another in order to enable a user to load media between the media supply holders and allow the media supply holders to be biased toward engagement with the media. This allows for some degree of freedom during the loading of the media as opposed to holding the media supply holders in a rigid, fixed relationship. While the media supply holders 157 may be biased toward one another, they may have an inner limit stop to limit the degree to which the media supply holders 157 may be moved inward. This inner limit stop may be configured to be the width of the media to be held by the media supply holders, or the inner limit stop may be set to a point slightly narrower than the media to be held by the media supply holders. Such a setting may preclude the media supply holders 157 from being biased to a point where they are too close together and it becomes cumbersome to install media between them. The inner limit stop holds the media supply holders 157 a set distance apart with the ability to be moved away from one another, against the bias, during the installation of a media supply.

Figure 5:
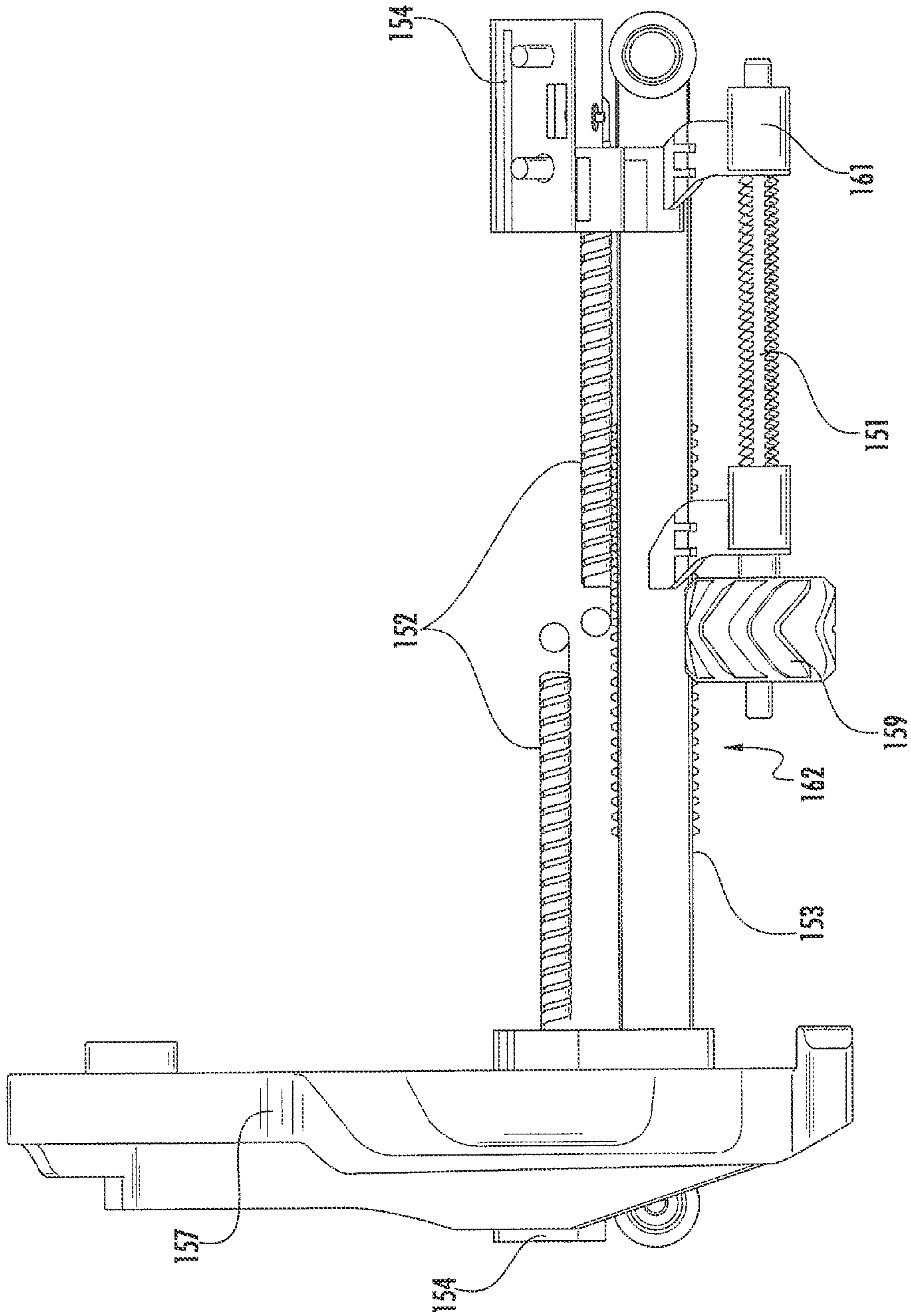
FIG. 5 illustrates an exploded view of a media supply holder adjustment mechanism according to an example embodiment of the present invention.

As noted above, media processing devices according to the present invention may be configured to process various media widths. Thus, it may be desirable to have an inner limit stop that is adjustable. Thumbwheel 159 may be configured to help accomplish this. FIG. 5 illustrates the media supply holder 157 adjustment mechanism as separated from the media processing device. In the illustrated embodiment of FIG. 5, a media supply holder 157 is carried by a media supply holder carrier 154. The second media supply holder 157 is not shown for ease of understanding. The media supply holder carriers 154 are carried by belt 153, and are biased toward one another by the springs 152. The thumbwheel 159 is securely attached to a threaded shaft 151. One of the media supply holder carriers 154 is engaged by the threaded shaft 151 within a threaded bore 161. In response to the thumbwheel being turned in a first direction, along arrow 162, the threaded shaft 151 rotates and the media supply holder carrier 154 attached to the threaded shaft by the threaded bore moves outwardly, away from the other media supply holder carrier 154. As both media supply holder carriers are affixed to belt 153, the second media supply holder carrier 154, attached to the opposing side of the belt 153, also moves outwardly, away from the first media supply holder. This adjusts the inner limit stop to accommodate a wider media supply. Conversely, rotation of the thumbwheel 159 in the direction opposite the arrow 162, the media supply holder carriers move toward one another. The thumbwheel 159 of the illustrated embodiment includes a texture which gives both a gripping surface by which a user can turn the thumbwheel, but the texture also gives a visual indication of the direction of movement of the media supply holders 157. Moving in the direction of the arrow texture increases the width, while moving against the direction of the arrow narrows the width.

Embodiments of the present invention may further include a platen 250 disposed along the media feed path configured to be engaged by the printhead 200 when the lid 120 is in the closed position. The media and the ribbon are configured to be received between the nip defined between the printhead 200 and the platen 250 as illustrated in FIG. 2. The platen 250 may define a drive roller and the separation between the printhead 200 and the platen 250 resulting from the lid 120 being moved to the open position may further enhance the ease of feeding media along the media feed path 195 and feeding of the ribbon along the ribbon printing path 190.

In order to facilitate loading and unloading of the ribbon cartridge 160 into the ribbon positioning assembly 220, the printhead 200 may be disengaged from the ribbon 193 and the ribbon cartridge 160 in response to the lid 120 being moved to the open position, and the ribbon positioning assembly 220 being moved to the accessible position. FIG. 6 illustrates a cross-section view of media processing device 100 of example embodiments with the lid 120 disposed in an open position relative to the base 110. As shown, the printhead 200 is withdrawn from between the first spool 170 and the second spool 180. The ribbon 193 may be held in tension between the first spool 170 and the second spool 180 when the ribbon positioning assembly 220 is in the accessible position through a tensioning mechanism 300 described further below and shown in FIG. 3.

As illustrated, while the lid 120 is in the open position relative to the base 110, and the ribbon positioning assembly 220 is in the accessible position as illustrated in FIG. 6, the ribbon cartridge 160 may be easily removed from the ribbon positioning assembly 220 by sliding the ribbon cartridge 160 along the direction of arrow 187. In some embodiments, a latch or detent mechanism may retain the ribbon cartridge 160 within the ribbon positioning assembly 220 such that the latch or detent mechanism may need to be disengaged before removing the ribbon cartridge 160. Such a latch or detent mechanism may serve to align the ribbon cartridge 160 in the media processing device 100 and preclude the ribbon cartridge 160 from shifting during printing or during movement of the media processing device 100. For example, the ribbon cartridge 160 may include a raised projection configured to be received within a corresponding recess of the ribbon positioning assembly 220. The raised projection may be positioned such that as the ribbon cartridge 160 is inserted into the ribbon position assembly 220, the projection is deflected to enable the projection to be received within the corresponding recess. Once the projection is engaged with the recess, the ribbon cartridge 160 may be more securely held within the ribbon position assembly.

FIG. 7 illustrates a cross-section view of the media processing device 100 of FIG. 6 with the lid 120 being advanced toward the closed position relative to the base 110. As illustrated, the lid 120 is disposed at about a 45-degree angle relative to the base and the ribbon cartridge 160 is no longer accessible to a user. As the lid 120 is closed relative to the base 110, the ribbon positioning assembly 220 is moved toward the inaccessible, printing position. Further, as the lid 120 is closed to the base 110, the printhead assembly 210 drives the printhead 200 between the first spool 170 and the second spool 180 of the ribbon cartridge 160 to engage the ribbon 193 which is deflected from the taught, straight ribbon path that the ribbon 193 was in when the lid 120 was in the open position and the ribbon positioning assembly 220 was in the accessible position. The axis of rotation of the first spool 170 and the axis of rotation of the second spool 180 (each such axis of rotation is shown for illustration purposes in FIG. 15) may combine to define a plane (also shown in FIG. 15) between them through which the printhead 200 is driven by the printhead assembly 210 as the lid 120 is closed relative to the base 110. The printhead assembly 210 may be pivotably mounted to the lid 120 at point 212 such that the angle of the printhead assembly 210 changes with respect to the lid 120 as the lid is moved from the open position of FIG. 6 toward the closed position.

The ribbon positioning assembly 220 includes various positioning features that ensure proper alignment between components of the media processing device. The ribbon positioning assembly 220 includes first and second sidewalls (described further below), that are structured to receive and support the ribbon cartridge 160. The first and second sidewalls may be joined together by structural support members that rigidly tie together the sidewalls to create a ribbon receiving cavity between the sidewalls. The media guide 230 may serve as one of the structural supports that ties the sidewalls together.

Figure 8:
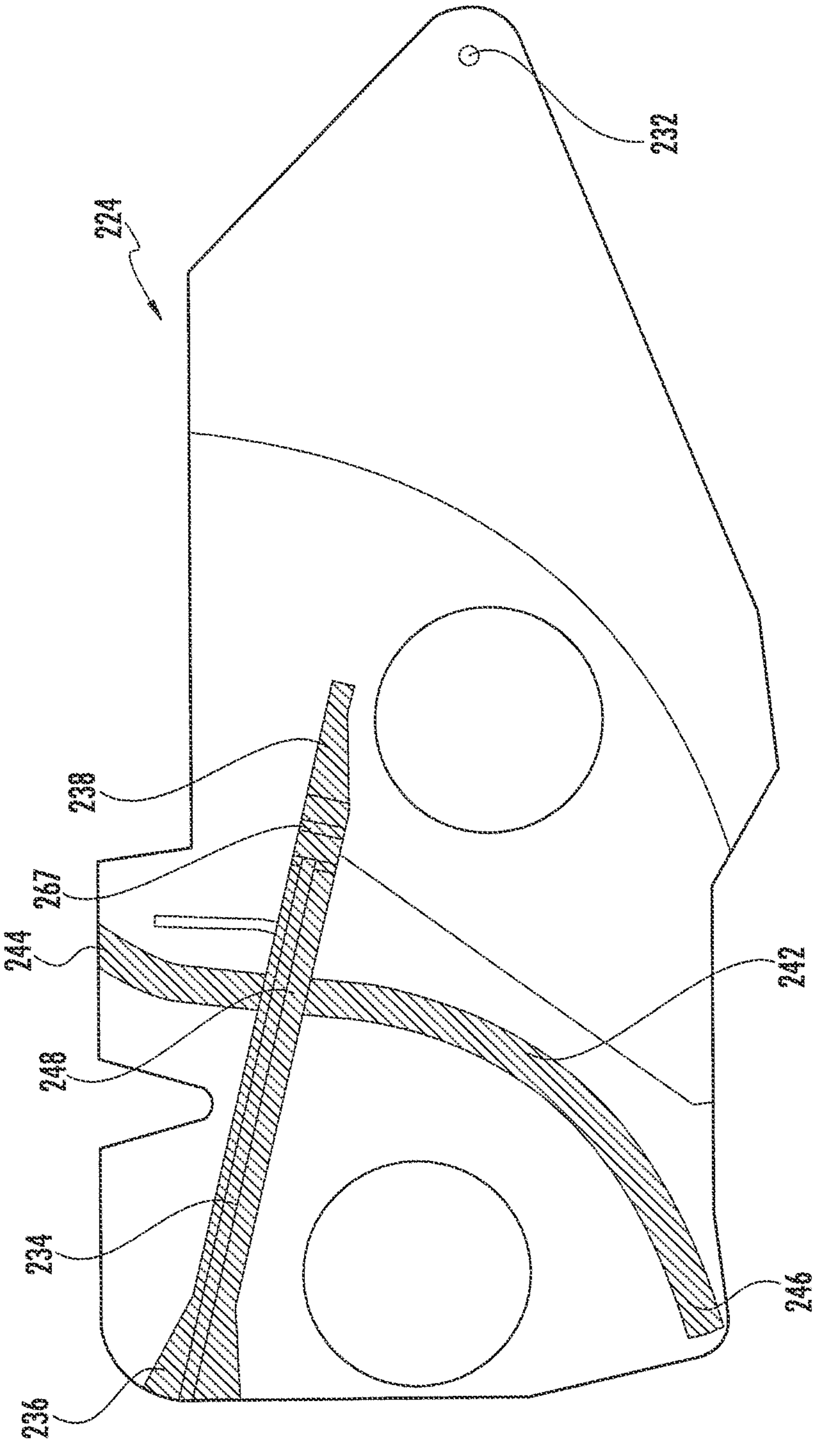
FIG. 8 illustrates a sidewall of a ribbon positioning assembly according to an example embodiment of the present invention.

Further, the ribbon positioning assembly 220 may include guides that direct the movement of components when the lid 120 is moved between the open position and the closed position. FIG. 8 illustrates a sidewall 224 of the ribbon positioning assembly 220 of FIGS. 6-13 as separated from the remaining components of the media processing device 100. The ribbon positioning assembly 220 may include two sidewalls, one disposed on either side of the ribbon cartridge 160, and both secured together by one or more cross-members (not shown). FIG. 8 illustrates the sidewall 224 as viewed from the ribbon cartridge 160 engaging side of the assembly (i.e., a viewpoint between the two sidewalls). The ribbon positioning assembly 220 may be hinged proximate a hinge point 232 of each of the sidewalls to allow the ribbon positioning assembly 220 to pivot between the printing position and the accessible position. The hinge point 232 may be hinged at the same location as the lid 120 is hinged 130; however, the hinge point 232 may also be hinged at a separate location to the base 110. As noted above, the lid 120 may be attached to the ribbon positioning assembly 220 by linkage 225 to enable movement of the ribbon positioning assembly in concert with the lid.

Figure 9:
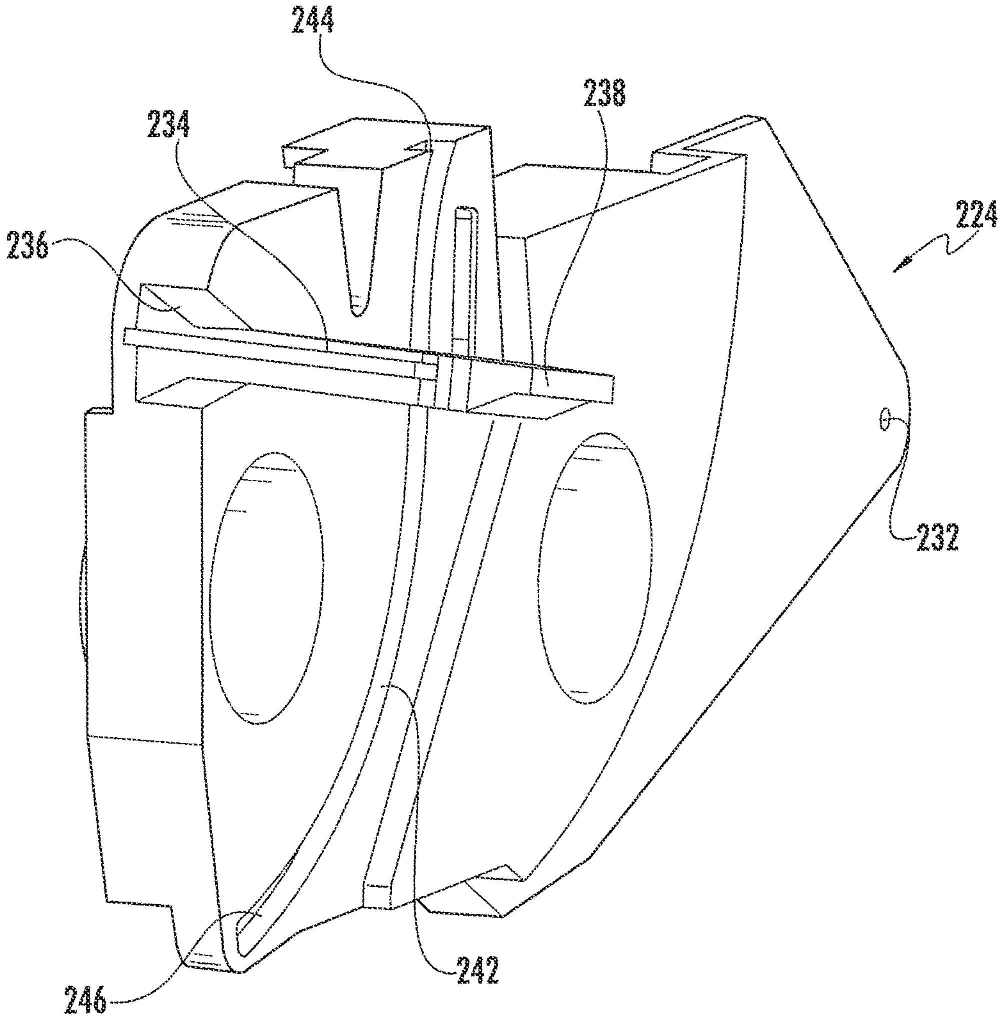
FIG. 9 illustrates a perspective view of the sidewall of FIG. 8.

According to the illustrated embodiment of FIG. 8, the sidewall 224 may include a ribbon receiving channel 234 configured to receive therein a portion of the cartridge 160. As outlined above, the ribbon cartridge 160 may be received within the ribbon position assembly 220 along a direction opposite to that of arrow 187 of FIG. 6. The ribbon cartridge 160 may include a frame with side rails 161 (illustrated further in FIGS. 14 and 15), configured to engage the ribbon receiving channel 234. The insertion end 236 of the ribbon receiving channel 234 may be wider than the ribbon receiving channel in order to allow a ribbon frame to be received at the insertion end 236 and guided into the ribbon receiving channel 234. The ribbon receiving channel 234 may also be configured with alignment features, such as a unique profile, that allows only ribbon cartridges with ribbon frames of a complementary profile to be received within the ribbon receiving channel. FIG. 9 illustrates a perspective view of the sidewall 224 of FIG. 8, better illustrating the profile of the ribbon receiving channel 234. Further, the ribbon receiving channel 234 may be of a specific length and may include a channel end feature 238, such as a taper, which may be in one or more dimensions, or a keyway to allow only those ribbon cartridge frames with the corresponding taper or key to be fully received within the ribbon receiving channel 234. Ribbon cartridges 160 without the appropriate ribbon cartridge side rails 161 may not properly seat within the channel 234 and therefore may not be usable with the ribbon position assembly 220.

A raised member, such as projection 239 of FIG. 15, may be configured to engage a correspondingly shaped recess within the ribbon positioning assembly 220 in order to ensure that appropriate ribbon cartridges 160 are used with the media processing device. The raised member may, for example, be a raised Z-shape, as illustrated in FIG. 10A. The ribbon positioning assembly 220 may include a corresponding, complementary raised surface 243, such as that shown in FIG. 10B. The raised Z-shape engages the raised complementary shape 243, as shown in FIG. 10C, when the media processing device cartridge is fully installed. The raised member 239 and complementary raised surface 243 function to both align the ribbon cartridge 160 to the ribbon positioning assembly 220 and to help preclude improper ribbon cartridges from properly seating within the ribbon positioning assembly. Further, according to some embodiments of the present invention, the ribbon positioning assembly may be configured with a radio frequency identification reader configured to read a radio frequency identification tag 241 of a ribbon cartridge received therein. FIG. 15 illustrates an example embodiment of the RFID tag 241. The tag 241 may be configured to store information related to the cartridge, such as media processing device settings (print speed, head temperature, etc.), ribbon type, ribbon serial number, usage statistics, etc. This information may be written to or read from the RFID tag by various components within the media processing device. Further, the media processing device may be configured to print only in response to the RFID tag 241 of the ribbon cartridge corresponding to a specific type of ribbon.

According to some embodiments of the present invention, an additional alignment feature may be included to align the ribbon cartridge 160 to the ribbon positioning assembly 220. This alignment feature may include a recess 242 disposed within the ribbon cartridge 160, and the ribbon positioning assembly 220 may include a pin configured to be received within the recess. The recess may be of any shape; however, a round shape may be desirable as the pin of the ribbon positioning assembly may then include a rounded shape with a tapered point, in order to promote self-alignment of the ribbon cartridge 160 with the pin as the ribbon cartridge is fully installed within the ribbon positioning assembly 220.

FIG. 11 depicts an example embodiment of a media processing device with the lid portion removed and the ribbon cartridge removed for ease of understanding. As shown, the sidewall 224 of the ribbon positioning assembly 220 includes the printhead assembly channel 244 and cartridge guide channel 234. Proximate the end of the cartridge guide channel 234 is tab 251, which is shown in greater detail in FIG. 12. Tab 251 includes the raised surface 243 for engaging a complementary raised member 239 of the media processing device cartridge 160. Tab 251 further includes pin 252 configured to engage the recess 242 of the ribbon cartridge 160. These features function to align the ribbon cartridge 160 and to help ensure an appropriate ribbon cartridge is installed. The pin 252 and the raised surface 243 also help align the RFID tag 241 of the ribbon cartridge 160 with the RFID reader 253 of the media processing device. The RFID reader, as described above, may read the RFID tag of the ribbon cartridge to confirm authenticity and/or to define media processing device settings.

Referring back to FIG. 9, the ribbon position assembly 220 sidewall 224 may further include a printhead assembly channel 242 to guide the printhead assembly 210 as the printhead 200 is driven between the first spool 170 and the second spool 180 of the ribbon cartridge 160. The printhead assembly 210 may include projections extending from either end of the longitudinally extending printhead 200 as illustrated in FIG. 20. These projections may engage the channel 242 to guide the printhead assembly 210 along a predefined path when the lid 120 of the media processing device 100 is moved between the open and closed positions. As the lid 120 is closed relative to the base 110, the printhead assembly 210 is driven along channel 242 from the top of the channel 244 to the bottom of the channel 246, whereupon the printhead 200 is in the engaged, printing position.

As illustrated in FIG. 8, the printhead assembly guide channel 242 crosses the ribbon cartridge guide channel 234 at 248, as the printhead assembly 210 is guided through the ribbon cartridge 160 when the lid 120 is closed. The ribbon cartridge frame side rails 161 may include a recess 163 proximate the location 248 where the channels cross when the ribbon cartridge 160 is in the installed position. This recess 163, as shown in FIGS. 15 and 16 163 allows the projections of the printhead assembly 210 to pass through the cartridge 160 as the printhead assembly 210 is guided along the printhead assembly guide channel 242. A ribbon cartridge 160 lacking this feature may preclude the lid 120 from being closed as the printhead assembly 210 may be prevented from passing between the first spool 170 and the second spool 180.

Referring back to FIG. 7, as the lid 120 is closed further toward the closed position relative to the base 110, the printhead 200 is further driven between the first spool 170 and the second spool 180 of the cartridge 160 until the lid 120 is closed relative to the base 110 as shown in FIG. 13. As shown, the printhead 200 has been driven through the imaginary plane defined between the axes of rotation (175 and 185 of FIG. 15) of the first spool 170 and the second spool 180 along the path defined by the printhead assembly guide channel 242. Further, as the lid 120 was closed the printhead 200 was guided between the first spool 170 and the second spool 180 of the ribbon cartridge 160, forward in the media processing device toward the second spool 180, which may be, for example, a take-up spool. This movement of the printhead 200 through the print cartridge 160 and toward a front side of the media processing device 100 may be facilitated by the pivotable mounting of the printhead assembly 210 to the lid 120 which allows the angle of the printhead assembly 210 to change relative to the lid 120 and the base 110 as the media processing device lid 120 is moved to the closed position and the printhead assembly 210 is guided along the printhead assembly guide channels 242 illustrated in FIGS. 8 and 9.

The lid 110 may further include one or more projections 167 disposed inside the lid configured to engage the ribbon cartridge 160 upon the lid being moved to the closed position. The one or more projections 167 may be configured to ensure the ribbon cartridge 160 is fully seated in the ribbon cartridge guide channel 234, thereby ensuring that the ribbon cartridge spools are properly engaged with the ribbon drive gears described further below. The one or more projections 167 may also preclude movement of the ribbon cartridge 160 during movement of the media processing device 100 by precluding any fore/aft movement of the ribbon cartridge 160, supplementing the security provided by the detent engagement of the printhead 160 within the printhead positioning assembly 220. The one or more projections 167 further ensure that the appropriate ribbon cartridge 160 is used. If a ribbon cartridge 160 cannot be properly seated within the ribbon cartridge guide channel 234, the projection 167 will preclude the lid 120 from closing properly, and prevent operation of the media processing device 100.

In the example embodiment described above with respect to FIGS. 6-13, the printhead 200 is moved with respect to the ribbon cartridge 160, through the ribbon cartridge 160 through a first plane defined between the axis of rotation 175 of the first spool 170 and the axis of rotation 185 of the second spool 180, and toward a second plane defined through the axis of rotation 185 of the second spool 180 and perpendicular to the first plane. In this manner, the printhead passes between the first spool 170 and the second spool 180, and becomes engaged with the ribbon along the ribbon printing path 190 (which is the position of the ribbon 193 of FIGS. 6 and 7 when the ribbon 193 is captured between the printhead 200 and the platen 250). The printhead 200 in the printing position of FIG. 13 is disposed between the platen roller 250 and the second spool 180.

The mechanism by which the printhead is advanced between the first spool 170 and the second spool 180 and advanced to the printing position of FIG. 13, including the printhead assembly 210 pivotably coupled to the lid 120 and the printhead assembly guide channel 242, may provide advantages for media processing device design by allowing the media processing device components to be arranged in a more compact housing. For example, positioning the printhead 200 and the platen roller 250, which define a print region therebetween that includes the ribbon path 190 and the media feed path 195, toward the front of the media processing device 100 enables the media drive components to be positioned between the print region and the media 150. Separating the print area from the moving components of the media drive components may reduce vibration at the print region and may increase print quality. Further, positioning the printhead 200 between the platen roller 250 and the second spool 180 enables the second spool 180 and the printhead 200 to be located proximate the front of the media processing device 100 as opposed to having the printhead 200 set back from the front of the media processing device 100 to accommodate a ribbon spool between the printhead and the front of the media processing device.

When the consumables of the media processing device 100, such as the ribbon cartridge 160 or the media 150, need to be replaced, the lid 120 of the media processing device needs to be moved to from the closed, printing position of FIG. 13 to the open position of FIG. 6. In order to open the lid 120, a user may release a latching mechanism that secures the lid 120 to the base 110. The latching mechanism may be a retaining hook or tab (not shown) disposed on either the lid 120 or the base 110 and engages a complementary recess on the other of the lid 120 or the base 110. The latching mechanism may be released by the press of a button which may disengage the tab from the corresponding recess, and allow the lid 120 to be moved to the open position relative to the base 110. As noted above, the lid 120 may include a spring or biasing mechanism, such as a torsion spring disposed proximate the hinge 130 to bias the lid 120 toward the open position. The biasing mechanism may, in some embodiments, be configured to move the lid 120 the closed position to the open position in response to the latching mechanism being disengaged. However, in other embodiments, the biasing mechanism may provide assistance to a user to lift the lid 120 to the open position. In example embodiments in which the biasing mechanism includes sufficient biasing force to lift the lid 120 to the open position, a user may open the media processing device 100 and obtain access to the cavity and consumable components with only a press of a button to release the latching mechanism. This may facilitate one-handed operation which may be beneficial if the user only has one hand free, such as when they are holding the replaceable consumables.

In response to the lid 120 being moved from the closed position to the open position, the printhead 200 becomes disengaged from the ribbon 193 and is moved out from between the first spool 170 and the second spool 180 of the cartridge 160, along the printhead assembly guide channel 242 from the bottom 246 to the top 244. In this manner, undesirable slack in the ribbon 193 may remain, such as when the length of ribbon exposed between the first spool 170 and the second spool 180 is sufficient for the length of ribbon printing path 190, but is not necessary when the printhead 200 is disengaged from the ribbon 193, leaving excess ribbon between the first spool 170 and the second spool 180. As such, it may be desirable to remove the slack from the ribbon 193 when the lid 120 is moved to the open position, the ribbon positioning frame 220 is moved to the accessible position, and the printhead 200 is disengaged from the ribbon 193.

Embodiments of the present invention may include a ribbon tensioning mechanism 300 as visible in FIG. 3 and shown in detail in FIG. 14. During printing, when the lid 120 is in the closed position and the ribbon positioning assembly 220 is in the inaccessible, printing position, one or both of the first spool 170 and the second spool 180 are driven to advance the ribbon 193 from the supply spool to the take-up spool as printing occurs. In the illustrated embodiment, both the first spool 170 and the second spool 180 are driven. A gear train including gears 310 may be driven by a pinion gear coupled to a drive assembly in the base 110 of the media processing device 100. In response to the pinion gear driving the gears 310 of the gear train, the gear 172 of the first spool 170 and the gear 182 of the second spool 180 may be driven, through tensioning mechanisms 302 and 304.

Tensioning mechanisms 302 and 304 may each include a driven gear that is coupled to the gears 310 of the gear train and a drive gear that is coupled to a respective one of the gears 172, 182 of the first spool 170 and the second spool 180. Between the driven gear and the drive gear of each tensioning mechanism 302, 304 may be a torsion spring and a clutch. In this manner, as the pinion gear drives gears 310 of the gear train, the driven gears of the tensioning mechanism are driven. The torsion spring of each tension mechanism 302, 304 is wound until a threshold force is achieved, at which time force is transmitted across the clutch of each tension mechanism 302, 304 to the drive gear of each tension mechanism, which drives the gears 172, 182 of the ribbon spools. During the process of printing, the torsion springs within the first and second tension mechanisms 302, 304, start to wind up and reach a maximum tension. This mechanism pre-loads the torsion springs of the tension mechanisms 302, 304 during printing and holds that preloaded torsion force during printing. While the illustrated embodiments include a ribbon cartridge, the tension mechanisms may also be used for a non-cartridge ribbon embodiment, such as with independent ribbon spools. The tension mechanisms help to minimize wrinkling of the ribbon which can lead to reduced print quality as the tension mechanisms apply tension during printing, while the tension mechanisms 302, 304 are preloaded, and maintain tension on the ribbon to keep the ribbon from folding over on itself when the printhead is disengaged from the ribbon.

In response to a user releasing a latching mechanism and opening the lid 120 of the media processing device 100 from the closed position to the open position, and the ribbon positioning assembly 220 is moved from the inaccessible, printing position to the accessible position, as shown in FIG. 6, the pinion gear of the drive assembly of the base 110 is disengaged from the gears 310 of the gear train. As the printhead 200 is disengaged from the ribbon 193, the slack in the ribbon is taken up by the unwinding of the first spool 170 and the second spool 180 caused by the torsion springs within tensioning mechanisms 302 and 304. As such, when the lid 120 of the media processing device 100 is opened, the ribbon 193 returns to be taught between the first spool 170 and the second spool 180, as illustrated in FIG. 6.

As described above, tension across the ribbon 193 between the first spool 170 and the second spool 180 is facilitated by the tensioning mechanisms 302 and 304. The tensioning mechanisms are engaged with the gears 172, 182 while the ribbon cartridge 160 is received within the ribbon positioning assembly 220. In order to maintain tension on the ribbon 193 between the first spool 170 and the second spool 180 when the ribbon cartridge is removed from the ribbon positioning assembly 220, another mechanism may be necessary.

According to embodiments of the present invention, as illustrated in FIG. 15, a ribbon cartridge 160 is provided which features a spool lock feature configured to prevent rotation of at least one of the first spool 170 and the second spool 180. The ribbon cartridge, as illustrated in FIG. 15, is viewed from the opposite side from which the spools are driven by the gears 310. A first spool lock feature 177 and a second spool lock feature 187 are each configured to engage a gear of a respective spool. According to the illustrated embodiment, the gear of each spool that is engaged by the spool lock features 177, 187 is contained within the cartridge housing 162. The gears, which may be a series of teeth disposed about the hub of a respective spool 170, 180, are configured to be engaged by a respective spool lock feature 177, 187. The spool lock features 177, 187 of the illustrated embodiment include a flexible pawl extending from the housing 162 including one or more gear teeth configured to engage the complementary teeth of the spool hub. A portion of the pawl extends through the housing between the exterior of the housing, and an interior of the housing where the gear teeth of the pawl engage the gear teeth of the spool hub. The pawls of the spool lock features 177, 187 are biased into engagement with their respective spools such that rotation of the spools 170, 180, is prevented when the ribbon cartridge 160 is not loaded into a media processing device. In response to the ribbon cartridge 160 being loaded into a media processing device, such as into ribbon receiving channels 234 of the ribbon positioning assembly 220, the portion of the spool lock features 177, 187 extending outside of the cartridge housing 162 may engage stationary features which drive the flexible pawls of the spool lock features out of engagement with the spool hubs as the ribbon cartridge is seated in position within the ribbon positioning assembly 220. These stationary features may be projections disposed on a sidewall 224 of the ribbon positioning assembly 220.

Embodiments of the ribbon cartridge 160 according to some examples may include a snap feature 165 configured to aid in retaining the ribbon cartridge 160 in the fully installed position within the ribbon positioning assembly 220. The snap feature 165 may be structured in a variety of manners, but in the illustrated embodiment, the snap feature 165 includes a ridge on a flexible member 166 of the cartridge. The flexible member 166 biases the snap feature away from the spool 180. The flexible member enables the snap feature 165 to be pushed inward toward the second spool 180 when the ribbon cartridge is inserted into the cartridge channel 234. The cartridge channel 234 may include a recess 267 configured to receive therein the snap feature 165, as illustrated in FIG. 8. Once the ribbon cartridge 160 is inserted to the fully installed position, the snap feature 165 becomes aligned with the recess and is biased into engagement with the recess. Thus holding the ribbon cartridge 160 in place within the cartridge channel 234. Removal of the ribbon cartridge 160 from the cartridge channel 234 may require the ribbon cartridge 160 to be pulled with sufficient force to overcome the bias of the snap feature 165, to enable the snap feature 165 to disengage the recess as the ribbon cartridge is slid out of the cartridge channel 234.

Installation of the ribbon cartridge 160 into the cartridge channel 234 may be relatively intuitive; however, in some instances, a user may not fully install the cartridge in the channel. For example, a user may not press the ribbon cartridge 160 far enough into the cartridge channel 234 for the snap feature 165 to engage the corresponding recess 267 of the cartridge channel. In such an instance, it may be desirable for the ribbon cartridge 160 to be configured to be driven from the partially installed position to the fully installed position. FIG. 16 illustrates a ribbon cartridge 160 positioned in a partially installed position within the cartridge channel 234 of the ribbon positioning assembly 220 sidewall 224. As shown, recess 163 of the ribbon cartridge 160 does not completely align with the printhead assembly guide channel 242. For example, the printhead assembly could not be guided through the channel 242 unimpeded. However, embodiments of a ribbon cartridge according to some examples may include drive surface 168 of recess 163. The drive surface 168 may be configured to be engaged by a printhead assembly as the printhead assembly is advanced along the printhead assembly channel 242 from the top 244 to the bottom 246. In response to the printhead assembly engaging the drive surface 168, the drive surface is angled in such a way that the ribbon cartridge 160 is driven along the cartridge channel 234 to the fully installed position. FIG. 17 illustrates the ribbon cartridge in the fully installed position. In the fully installed position, the recess 163 is aligned with the printhead assembly channel 242 such that the printhead assembly can pass, unimpeded, along the printhead assembly channel.

FIG. 18 illustrates a cross-section view of the ribbon cartridge 160 of FIG. 15, taken along section line 18-18 of FIG. 15. As illustrated, the spool lock features 177, 187, are flexible pawls including one or more gear teeth 178, 188 extending therefrom. Each of the spools 170, 180, include a series of teeth 179, 189, disposed about a respective hub, that are engaged by the spool locking features.

While the above disclosed embodiments describe a ribbon positioning assembly 220 that is configured to receive a ribbon cartridge therein, embodiments of the invention may further be configured with ribbon positioning assemblies that are configured to receive loose ribbon spools that do not include a cartridge. In this manner, a second ribbon positioning assembly 222 may be interchangeable with the ribbon positioning assembly 220 configured to receive a ribbon cartridge, as illustrated in FIG. 19. The media processing device 100 may be configured to interchangeably receive the ribbon positioning assembly 220 for a ribbon cartridge 160 and the ribbon positioning assembly 222 for ribbon spools. The ribbon positioning assemblies may attach at the pivot point 400 and linkage 225 such that the ribbon positioning assembly that is installed moves with the lid 120 between the inaccessible, printing position when the lid 120 is in the closed position, and the accessible position when the lid 120 is in the open position.

FIG. 20 illustrates a printhead 200 and printhead assembly 210 according to an example embodiment of the invention. The printhead assembly, as described above, may pivot relative to the lid 120. This may be accomplished by pivoting mounts, such as pins 212 received within corresponding holes of the lid 120. The printhead 210 may include an anti-wrinkle feature to help improve print quality by stretching the ribbon 193 and removing wrinkles from the ribbon 193 as they approach the print line 204 of the printhead 200. The anti-wrinkle feature may include a deflector assembly 202 disposed immediately upstream of the print line 204 relative to the media and ribbon feed paths. The deflector assembly may include a convex curvature to stretch the ribbon 193 across the deflector 202 ahead of the print line 204. This may reduce wrinkles in the ribbon 193 at the print line 204 and reduce the amount of printhead force generally used to eliminate ribbon wrinkles at the print line. This deflector 202 may thus allow for less force and less structure necessary in the printhead assembly 210 to achieve an equivalent or superior print quality to comparable printheads. Printhead assembly 210 may further include ribbon-out sensor 213, as described above. In the illustrated position, the surface 215 that mimics the specific ribbon material that indicates a ribbon-out condition may be obstructed from ribbon-out sensor 213 by a ribbon when the printhead assembly 210 is in the printing position and a ribbon is installed.

The media used by media processing devices of example embodiments may be in a variety of forms. For example, media may be of the fan-fold variety as described above and may be used for processing tickets for travel, such as airline tickets. Media may also be continuous feed media that is perforated to enable separation of media units from the continuous roll of media. Still further, media may be an adhesive label that is carried by a carrier backing, where the carrier may include a release layer (e.g., a silicone layer), that enables an adhesive label to be peeled from the carrier after processing of the media. Embodiments where the media is an adhesive label may be used in shipping facilities or other locations where a label needs to be applied to a surface.

According to embodiments in which the media processing device is configured to process labels carried by a carrier backing, it may be desirable to peel the label from the carrier as the media exits the media processing device. In such embodiments, the present invention may include a modular peeling mechanism adapted to be removably installed on the media processing device. FIG. 21 illustrates a cross section of the media processing device of FIG. 7, proximate where the media exits the media processing device along media feed path 195. However, the illustrated embodiment of FIG. 21 further includes modular peel mechanism 500. The modular peel mechanism 500 is configured to enable the continuous strip of carrier backing 510 to be peeled from the media as the media proceeds along media feed path 195. As the continuous strip of carrier backing 510 exits the media processing device at media exit 520, the carrier backing 510 follows a path beginning with a sharp bend at the media exit 520. The sharp bend is imparted by the carrier backing 510 being fed through the modular peel mechanism 500, and between the platen roller 250 and the modular peeling mechanism roller 530.

Modular peel mechanism 500 may be configured to be installed to a media processing device by an end-user rather than, or in addition to being available to be installed during manufacture. In the illustrated embodiment, the modular peel mechanism may be snapped into place to replace a decorative fascia piece and may be held in place by one or more screws, with the preference being a small number, such as two, to facilitate easy installation and removal of the modular peel mechanism. The modular peel mechanism may further include an electrical connector to enable electrical connection of the modular peel mechanism 500 to the media processing device to enable certain functions of the modular peel mechanism, such as the label-taken sensor, as will be described further below. The electrical connector may be configured such that, upon installation of the modular peel mechanism 500 to the media processing device, the connector is received by the media processing device, and no additional connection step is required.

According to the illustrated embodiment of FIG. 21, as the media, including the media labels and the carrier backing 510 are processed at the nip 540 defined between the printhead 200 and the platen roller 250, the platen roller drives and advances the media labels and carrier backing 510 along the media feed path 195. Upon the media labels and carrier backing 510 exiting the media processing device at media exit 520, the carrier backing 510 is bent back at a sharp angle, which causes the media label to be separated from the carrier backing. This results in the media label continuing along media feed path 195, while the carrier backing 510 advances along carrier path 550. Further, the platen roller 250, as it continues to advance the media and carrier backing along media feed path 195 before it exits the media processing device, the platen roller 250 is also serving to drive and advance the carrier backing 510 that has already exited the media processing device and entered the modular peel mechanism at nip 560. This secondary advancing of the carrier backing 510 at nip 560 helps to avoid binding of the carrier backing 510 in the modular peel mechanism and promotes even peeling of the media label from the carrier backing.

In order to process and peel media labels from a carrier backing, it may be desirable to have a mechanism in place to alert the media processing device when a processed label has been removed by a user at the media exit 520. Absent some mechanism to alert the media processing device of the removal of a processed media label, a manual indication may need to be provided to the media processing device to avoid continuous processing and peeled media labels piling up and adhering to one another at the media exit 520. Embodiments of the modular peel mechanism disclosed herein may include a "media label taken" sensor 570 disposed proximate the media exit 520. The media processing device may process a media label until the processing is complete and the media label is ready to be retrieved by a user from the media exit 520. Until that media label is retrieved (i.e., while the media label taken sensor 570 detects the presence of a media label), the processing operation may be suspended. In response to a user or a media label applicator device retrieving the media label, the media label taken sensor 570 may detect that the media label was retrieved, and a subsequent media label may be processed and peeled, to be presented for retrieval.

While automated peeling during media processing as performed by the modular peel mechanism 500 described above is desirable, one drawback is the initial feeding of the modular peel mechanism 500 with the carrier backing 510 to initiate the peeling process. The initial feeding can be tedious, particularly when the carrier backing is not evenly torn or cut, and when the carrier backing must be fed through a relatively small opening or nip. In order to improve this process, embodiments of the modular peel mechanism 500 described herein may be configured to be pivotable, as illustrated in FIG. 22. According to the illustrated embodiment, the modular peel mechanism 500 may be configured to pivot about pivot point 580 to an open, loading position. In the illustrated position of FIG. 22, the carrier backing 510 may be easily fed between the platen roller 250 and the peeling mechanism roller 530. Upon feeding the carrier backing 510 along carrier path 550, the modular peel mechanism 500 may be closed or returned to the position illustrated in FIG. 21, to commence media processing and peeling.

In order to maintain consistent, even peeling of the carrier backing 510 from the media labels, a user may apply a pulling force to the carrier backing 510 as it exits the modular peel mechanism 500 along carrier path 550. However, such force can create a tension on the carrier backing 510 which would urge the modular peel mechanism 500 to the open/loading position. As such, embodiments of the present modular peel mechanism 500 may include a latch to hold the modular peel mechanism in the closed position illustrated in FIG. 21. This latch may be released via depression of a button on the modular peel mechanism, and the latch may be substantial enough to not be overcome by the mere tension applied to the carrier backing 510 as it exits the modular peel mechanism 500.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A media processing device, comprising:

a base;

a lid rotatable coupled to the base by a hinge, the lid movable between an open position and a closed position;

a cavity defined between the base and the lid, the cavity including a media receiving area, the cavity being inaccessible when the lid is in the closed position and being accessible when the lid is in the open position;

a pair of media supply holders that are opposingly spaced from each other and configured to engage a spool of media between the pair of media supply holders, the media supply holders are biased towards each other and are movable towards or away from each other;

an inner limit stop that holds the pair of media supply holders a set distance apart from each other.

2. The media processing device of claim 1, wherein the inner limit stop is configured to be a width of the media to be held by the media supply holders.

3. The media processing device of claim 1, wherein the inner limit stop is configured to be set to a point slightly narrower than a width of the media to be held by the pair of media supply holders.

4. The media processing device of claim 1, wherein the media supply holders are precluded from being biased to a point where the pair of media supply holders prevent installation of media between the pair of media supply holders.

5. The media processing device of claim 1, wherein the inner limit stop is adjustable to specify the set distance.

6. The media processing device of claim 1, further comprising:

an actuator disposed in the cavity and operatively coupled to the pair of media supply holders, the actuator configured to adjust a position of the pair of media supply holders.

7. The media processing device of claim 6, wherein the actuator comprises a thumbwheel.

8. The media processing device of claim 7, wherein, in response to the thumbwheel being turned in a first direction, the pair of media supply holders move outwardly away from each other.

9. The media processing device of claim 8, wherein, in response to the thumbwheel being turned in a second direction that is opposite the first direction, the pair of media supply holders move inwardly towards each other.

10. The media processing device of claim 6, wherein the thumbwheel includes a texture which provides a gripping surface and a visual indication of a direction of movement.

* * * * *